US012669722B2

(12) United States Patent
Tarof et al.

(10) Patent No.: US 12,669,722 B2
(45) Date of Patent: *Jun. 30, 2026

(54) ELECTRO-ABSORPTION MODULATOR AND MONOLITHIC ELECTRO-PHOTONIC INTEGRATED CIRCUIT COMPRISING AN ELECTRO-ABSORPTION MODULATOR AND DRIVER ELECTRONICS

(71) Applicant: ElectroPhotonic-IC Inc., Kanata (CA)

(72) Inventors: Lawrence E. Tarof, Kanata (CA);
Vighen Pacradouni, Montreal (CA);
Kirill Pimenov, Orleans (CA); Yury Logvin, Kanata (CA); Dhiraj Kumar, Redondo Beach, CA (US); Francois Tremblay, Gatineau (CA); Richard D. Clayton, Ottawa (CA)

(73) Assignee: ElectroPhotonic-IC Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/317,684

(22) Filed: Sep. 3, 2025

(65) Prior Publication Data

US 2026/0169317 A1    Jun. 18, 2026

Related U.S. Application Data

(60) Provisional application No. 63/736,173, filed on Dec. 19, 2024, provisional application No. 63/734,954, filed on Dec. 17, 2024.

(51) Int. Cl.
*G02F 1/015* (2006.01)
*G02F 1/017* (2006.01)
*G02F 1/025* (2006.01)

(52) U.S. Cl.
CPC ........ *G02F 1/0157* (2021.01); *G02F 1/01708* (2013.01); *G02F 1/025* (2013.01)

(58) Field of Classification Search
CPC ......... G02F 1/0155–0159; G02F 1/017; G02F 1/01708
See application file for complete search history.

(56) References Cited

U.S. PATENT DOCUMENTS

| | | | |
|---|---|---|---|
| 5,063,426 A | 11/1991 | Chandrasekhar | |
| 5,459,747 A * | 10/1995 | Takiguchi ................. | H01S 5/12 372/45.01 |

(Continued)

FOREIGN PATENT DOCUMENTS

| | | |
|---|---|---|
| CN | 1790846 A | 6/2006 |
| CN | 101006382 A | 7/2007 |

(Continued)

OTHER PUBLICATIONS

M. Stepanenko et al. Multi-parameter optimization of an InP electro-optic modulator. Symmetry, 12, 1920, 18 pages, Nov. 2020 (https://doi.org/10.3390/sym12111920) (Year: 2020).*

(Continued)

*Primary Examiner* — Michael Stahl
(74) *Attorney, Agent, or Firm* — Miltons IP/p.i.

(57) ABSTRACT

An electro-optic device comprising a waveguide (WG)-device configured as an electro-absorption modulator (EAM) and electronics comprising an EAM driver. The electro-optic device comprising: a semi-insulating (SI) indium phosphide (InP) substrate; an epitaxial layer stack formed on the SI:InP substrate comprising a first plurality of semiconductor layers forming InP heterojunction bipolar transistors of the electronics and a second plurality of semiconductor layers structured to form a PIN waveguide of the EAM, the PIN waveguide comprising: an n-layer structure and a p-layer structure; an i-region comprising optical material located between the n-layer structure and the p-layer structure; the n-layer structure and the p-layer structure configured to optical confine one or more modes of an (Continued)

Epitaxial layer structure for monolithic electro-photonic integrated circuit comprising EAM and EAM Driver

1200 optical signal configured to propagate through the i-region; and at least one of the n-layer structure and the p-layer structure comprises a mode extending layer.

30 Claims, 17 Drawing Sheets

(56) References Cited

U.S. PATENT DOCUMENTS

| | | | |
|---|---|---|---|
| 5,475,256 A | 12/1995 | Sawada | |
| 5,489,798 A | 2/1996 | Doguchi | |
| 5,530,580 A * | 6/1996 | Thompson | G02F 1/017 |
| | | | 359/248 |
| 5,557,117 A | 9/1996 | Matsuoka | |
| 5,561,301 A * | 10/1996 | Inoue | H01S 5/34 |
| | | | 257/17 |
| 5,680,411 A * | 10/1997 | Ramdane | H01S 5/12 |
| | | | 372/50.1 |
| 5,684,308 A | 11/1997 | Lovejoy | |
| 5,689,122 A | 11/1997 | Chandrasekhar | |
| 6,088,500 A * | 7/2000 | Zmudzinski | G02F 1/01708 |
| | | | 372/50.1 |
| 6,294,821 B1 | 9/2001 | Chandrasekhar | |
| 6,310,995 B1 * | 10/2001 | Saini | G02B 6/1228 |
| | | | 385/39 |
| 6,734,519 B1 | 5/2004 | Nakaji | |
| 7,444,055 B2 | 10/2008 | Tolstikhin et al. | |
| 7,910,953 B2 | 3/2011 | Nakaji | |
| 8,183,612 B2 | 5/2012 | Chong | |
| 9,455,790 B2 | 9/2016 | Seo | |
| 10,331,007 B2 | 6/2019 | Yoneda | |
| 10,530,484 B2 | 1/2020 | Hjartarson et al. | |
| 10,673,532 B2 | 6/2020 | Hjartarson et al. | |
| 10,897,311 B2 | 1/2021 | Tu | |
| 12,087,871 B2 | 9/2024 | Wang | |
| 12,212,369 B2 | 1/2025 | Tarof et al. | |
| 12,218,157 B2 | 2/2025 | Tarof | |
| 2002/0187580 A1 * | 12/2002 | Kondo | H01S 5/227 |
| | | | 438/47 |
| 2003/0156311 A1 * | 8/2003 | Tada | G02F 1/025 |
| | | | 359/248 |
| 2004/0033004 A1 | 2/2004 | Welch et al. | |
| 2004/0067006 A1 * | 4/2004 | Welch | G02B 6/12011 |
| | | | 385/14 |
| 2004/0135136 A1 | 7/2004 | Takahashi | |
| 2004/0240025 A1 * | 12/2004 | Bour | B82Y 20/00 |
| | | | 359/241 |
| 2005/0249509 A1 * | 11/2005 | Nagarajan | H01S 5/12 |
| | | | 398/198 |
| 2006/0045522 A1 | 3/2006 | Gill | |
| 2006/0108574 A1 * | 5/2006 | Nam | B82Y 20/00 |
| | | | 257/13 |
| 2006/0159381 A1 * | 7/2006 | Tsuzuki | G02F 1/01708 |
| | | | 385/1 |
| 2007/0133636 A1 | 6/2007 | Park | |
| 2008/0179496 A1 | 7/2008 | Sakura et al. | |
| 2008/0315182 A1 * | 12/2008 | Takada | H01S 5/343 |
| | | | 257/14 |
| 2010/0215308 A1 | 8/2010 | Moodie | |
| 2012/0141122 A1 | 6/2012 | Carusone et al. | |
| 2016/0170241 A1 | 6/2016 | Adams | |
| 2019/0146151 A1 | 5/2019 | Meister et al. | |
| 2020/0116932 A1 | 4/2020 | Hjartarson et al. | |
| 2021/0175682 A1 * | 6/2021 | Okuda | H01S 5/0265 |
| 2022/0045767 A1 | 2/2022 | Li | |
| 2022/0128843 A1 | 4/2022 | Adams et al. | |
| 2022/0190550 A1 | 6/2022 | Hjartarson et al. | |
| 2022/0232301 A1 | 7/2022 | Biederman | |
| 2023/0019783 A1 | 1/2023 | Tarof | |
| 2023/0132985 A1 | 5/2023 | Menezo | |
| 2023/0221588 A1 | 7/2023 | Oron et al. | |
| 2024/0176170 A1 * | 5/2024 | Park | G02F 1/025 |
| 2025/0088279 A1 | 3/2025 | Hjartarson et al. | |
| 2025/0107252 A1 | 3/2025 | Tarof | |

FOREIGN PATENT DOCUMENTS

| | | | |
|---|---|---|---|
| CN | 105048283 A | | 11/2015 |
| CN | 108899761 A | | 11/2018 |
| CN | 109791314 A | | 5/2019 |
| EP | 3054489 B1 | | 1/2020 |
| JP | 2005-84333 A | * | 3/2005 |
| WO | WO 01/13479 A1 | * | 2/2001 |
| WO | 2015054469 A1 | | 4/2015 |
| WO | 2021097560 | | 5/2021 |
| WO | 2021097560 A1 | | 5/2021 |
| WO | 2021119803 A1 | | 6/2021 |
| WO | 2024259526 A1 | | 12/2024 |

OTHER PUBLICATIONS

D. Gulyaev et al. InP-based electro-optic and electro-absorption modulators for the 1.5-μm spectral range. Bulletin of the Lebedev Physics Institute, vol. 51, suppl. 2, pp. S101-S116, Jun. 2024 (https://doi.org/10.3103/S1068335624600608) (Year: 2024).*

H. Wang et al. Optimization of 1.3-μm InGaAsP / InP electro-absorption modulator. Chinese Physics Letters, vol. 32 No. 8, 5 pages, 2015 (https://doi.org/10.1088/0256-307X/32/8/084203) (Year: 2015).*

P. Juodawlkis et al. InGaAsP / InP quantum-well electrorefractive modulators with sub-volt Vπ. Proceedings of SPIE vol. 5435, pp. 53-63, Aug. 2004 (https://doi.org/10.1117/12.546786) (Year: 2004).*

K. Wakita et al. High-speed InGaAlAs / InAlAs multiple quantum well optical modulators. Journal of Lightwave Technology, vol. 8 No .7, pp. 1027-1032, Jul. 1990 (https://doi.org/10.1109/50.56402) (Year: 1990).*

H. Casey et al. GaAs—AlxGa1—x heterostructure laser with separate optical and carrier confinement. Journal of Applied Physics, vol. 45 No. 1, pp. 322-333, Jan. 1974 (https://doi.org/10.1063/1.1662980) (Year: 1974).*

S. Chandrasekhar, et al., "Eight-Channel p-i-n/HBT Monolithic Receiver Array at 2.5Gb/s Per Channel for WDM Applications", IEEE Photonics Technology Letters, vol. 6, No. 10, pp. 1216-1218, Oct. 1994, doi: 10.1109/68.329643.

K. Kiziloglu et al., "InP-based high sensitivity pin/HEMT/HBT monolithic integrated optoelectronic receiver," Conference Proceedings. 1998 International Conference on Indium Phosphide and Related Materials (Cat. No. 98CH36129), Tsukuba, Japan, 1998, pp. 443-446; doi: 10.1109/ICIPRM.1998.712506.

J. Caldwell, "Transimpedance Amplifiers: What Op Amp Bandwidth do I need"; 2014 https://e2e.ti.com/blogs_/b/precisionhub/archive/2014/05/07/transimpedance-amplifiers-what-op-amp-bandwidth-do-i-need-part-i.aspxDCMP=hpa-pa-opamp HQS=hpa-pa-opamp-fb-thehub-20140516-20140507-part1-en.

Burr-Brown Corporation, application bulletin 1994, "Noise Analysis of FET Transimpedance Amplifiers".

K. W. Kobayashi, "State of the Art 60 GHZ, 3.6 K-Ohm transimpedance amplifier for 40 GB/s and beyond", IEEE Radio Frequency Integrated Circuits (RFIC) Symposium, 2003; Jun. 9-10, 2003; DOI: 10.1109/RFIC.2003.1213892.

J-Y Dupuy, et al., "59-dB? 68-GHz Variable Gain-Bandwidth Differential Linear TIA in 0.7-μm InP DHBT for 400-GB/s Optical Communication Systems", 2015 IEEE Compound Semiconductor Integrated Circuit Symposium (CSICS), 2015, pp. 1-4, doi: 10.1109/CSICS.2015.7314463.

Maxim Integrated, Application Note: HFAN-3.2.0 Rev.1; Apr. 2008— "Improving noise rejection of a PIN-TIA Rosa".

J. Broeckaert, et al., "Thin-Film II-Photodetectors Integarated on Silicon-on-Insulator Photonic ICs", J. Lightwave Technology, vol. 25, No. 4, Apr. 2007.

Allard Van Der Horst, "Technology to the rescue of next-generation 10G PON networks", LightWave Online, Apr. 1, 2010; (https://www.lightwaveonline.com/fttx/article/16649200/technology-to-the-rescue-of-neP/lxtgeneration-10g-pon-networks).

G. Royo, et al., "A highly linear low-noise transimpedance amplifier for indoor fiber-wireless remote antenna units", Electronics 2019, 8, 437; doi: 10.3390/electronics8040437.

(56)          References Cited

OTHER PUBLICATIONS

Luis Orozco, et al., "Optimizing Precision Photodiode Sensor Circuit Design", Analog Devices Technical Article MS-2624, 2014 (www.analog.com).

C. L. F. MA, et al., "Modelling of Breakdown Voltage and Its Temperature Dependence in SAGCM InP/InGaAs Avalanche Photodiodes" Proceedings of 1994 IEEE International Electron Devices Meeting, 1994, pp. 583-586, doi: 10.1109/IEDM.1994.383341.

GCS Preliminary Datasheet "56GBaud 1310nm/1550nm InGaAs PIN PD" DO480_16um_C3 NH www.gcsincorp.com downloaded Oct. 29, 2019.

GCS Preliminary Datasheet "56GBaud 1310nm/1550nm InGaAs PIN PD" DO480_16um_C3 www.gcsincorp.com downloaded Oct. 25, 2019.

B. Razavi, "The Transimpedance Amplifier", IEEE Solid-State Circuits Magazine, Winter 2019.

International Search Report issued on International Patent Application No. PCT/CA2020/051666 dated Feb. 15, 2021; 3 pages.

Chen, G. et al.; "Compact and Efficient Thin-Film Lithium Niobate Modulators"; Advanced Photonics Research; 2023; 4; 2300229; www.adpr-journal.com; pp. 1-15.

Minkenberg, C. et al. "Co-packaged datacenter optics: Opportunities and challenged"; IET Optoelectronics; 2021; 15 ;The Institue of Engineering and Technology; Sep. 16, 2020; pp. 77-91.

Piprek, J. et al.; "High-Efficiency MQW Electroabsorption Modulators"; University of California, ECE Department; Jan. 2002; 11 pages.

* cited by examiner

Area A=w*l w l d

Dimensions of MQW i-region

104

$$C\_intrinsic = \varepsilon A/d = \varepsilon * w * l/d$$

$$C\_device = C\_intrinsic + C\_pad$$

$$f\_3dB = 1/(2\pi\, R\_\Omega\, C\_device)$$

Fig. 6
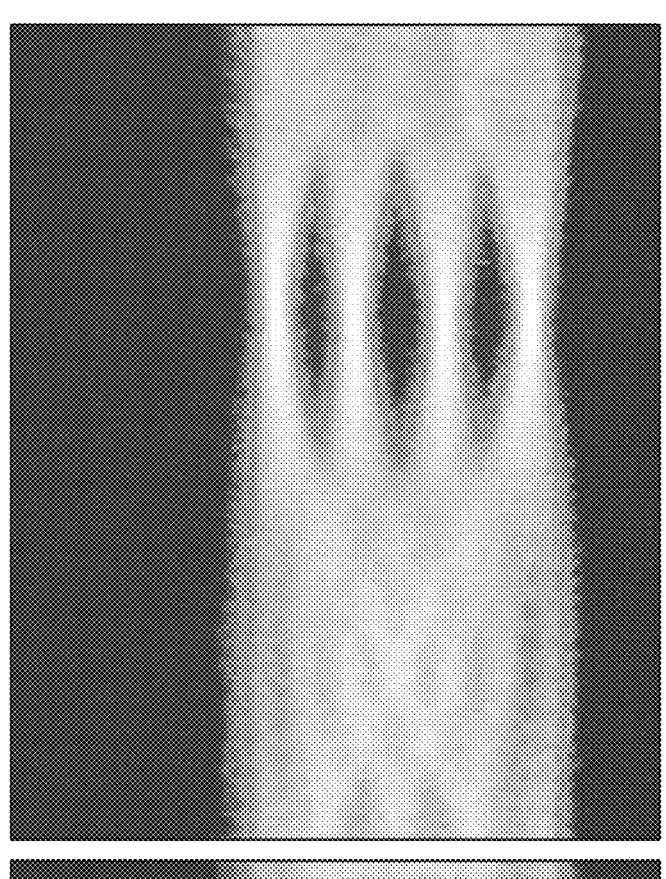
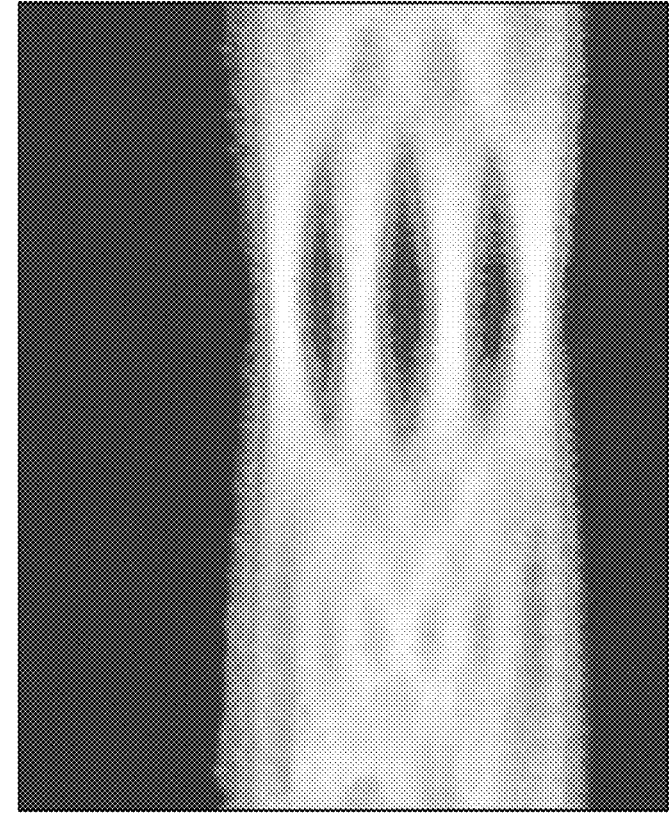

1100

| 1134 | EAM Waveguide Epi-layers |
| 1132 | InP HBT Epi-layers |
| 1106 | SI InP Substrate |

1130

EAM Waveguide 1102

Interconnect

1100

EAM Driver circuitry —1104

SI InP Substrate —1106

Fig. 12

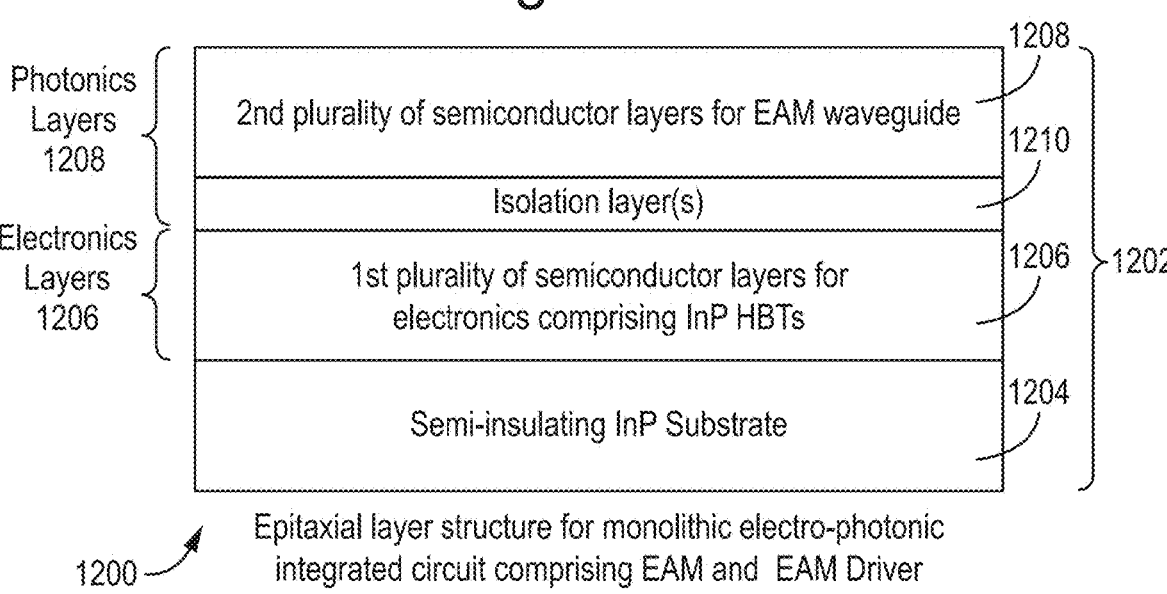

Photonics Layers 1208

Electronics Layers 1206

| | |
|---|---|
| 2nd plurality of semiconductor layers for EAM waveguide | 1208 |
| Isolation layer(s) | 1210 |
| 1st plurality of semiconductor layers for electronics comprising InP HBTs | 1206 |
| Semi-insulating InP Substrate | 1204 |

1202

Epitaxial layer structure for monolithic electro-photonic integrated circuit comprising EAM and EAM Driver

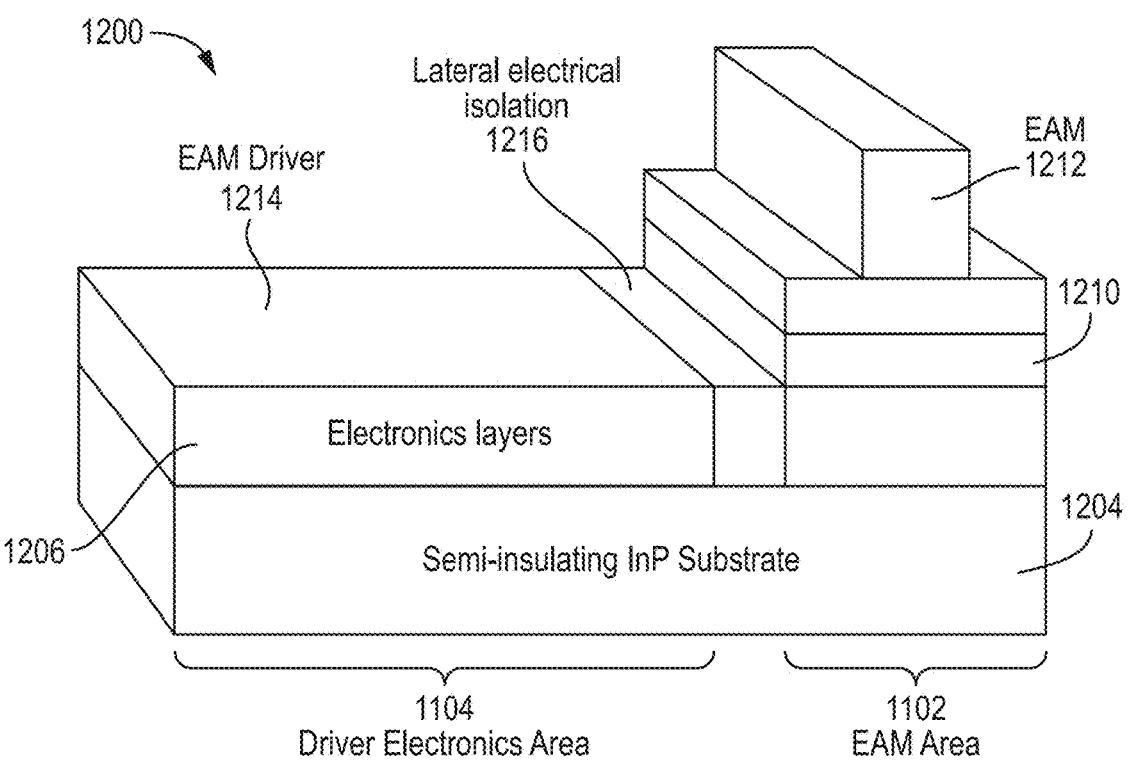

1200

Lateral electrical isolation 1216

EAM 1212

EAM Driver 1214

1210

Electronics layers

1204

1206

Semi-insulating InP Substrate

1104
Driver Electronics Area

1102
EAM Area

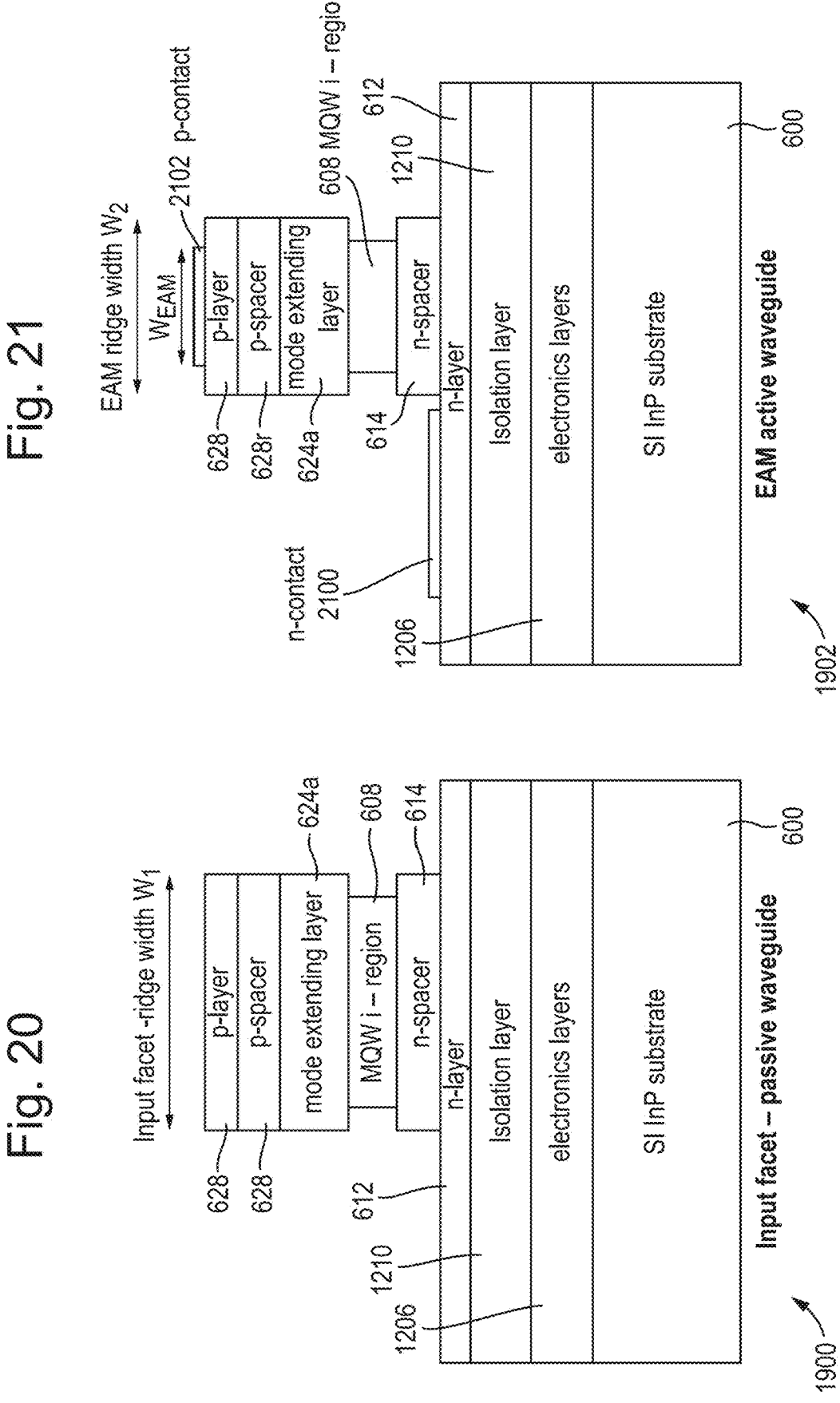

Fig. 21

EAM ridge width W₂

2102 p-contact

W_EAM 628 p-layer
628r p-spacer
624a mode extending layer
608 MQW i – region
1210
612
n-spacer
614 n-layer
Isolation layer
electronics layers
SI InP substrate
600 n-contact 2100

1206

EAM active waveguide

Input facet -ridge width W₁

628 p-layer
628 p-spacer
624a mode extending layer
608 MQW i – region
614 n-spacer
612 n-layer
1210
Isolation layer
electronics layers
SI InP substrate
600

1206

Input facet – passive waveguide

1900

ELECTRO-ABSORPTION MODULATOR AND MONOLITHIC ELECTRO-PHOTONIC INTEGRATED CIRCUIT COMPRISING AN ELECTRO-ABSORPTION MODULATOR AND DRIVER ELECTRONICS

CROSS-REFERENCE TO RELATED APPLICATIONS

This application claims the benefit of U.S. provisional patent application No. 63/736,173 entitled "Waveguide Photodiode And Monolithic Electro-Photonic Integrated Circuit Comprising A Waveguide Photodiode And Transimpedance Amplifier" filed Dec. 19, 2024, and U.S. provisional patent application No. 63/734,954 entitled "Electro-Absorption Modulator And Monolithic Electro-Photonic Integrated Circuit Comprising An Electro-Absorption Modulator And Driver" filed Dec. 17, 2024 incorporated herein by reference in their entirety.

This application is related to U.S. patent application Ser. No. 17/687,803, filed Mar. 7, 2022, entitled "Vertically Integrated Electro-Absorption Modulated Lasers and Methods of Fabrication", which is a Continuation-in-Part of PCT International Patent application no. PCT/CA2020/051562, filed Nov. 17, 2020, designating the United States, entitled "Vertically Integrated Electro-Absorption Modulated Lasers and Methods of Fabrication", which claims the benefit of U.S. provisional patent application No. 62/936,629, filed Nov. 18, 2019, entitled "Vertically Integrated Electro-Absorption Modulated Lasers and Methods of Fabrication", all of which are incorporated herein by reference in their entirety.

This application is related to U.S. patent application Ser. No. 16/708,887, filed Dec. 10, 2019, entitled "Electro-Absorption Modulator with Integrated Control Loop for Linearization and Temperature Compensation", which is a continuation-in-part of U.S. patent application Ser. No. 16/263,169, filed Jan. 31, 2019, entitled "Integrated Control Loop for Linearization and Temperature Compensation of an Electro-Absorption Modulator", which claims the benefit of U.S. provisional patent application No. 62/625,311, filed Feb. 1, 2018, of the same title; these applications are incorporated herein by reference in their entirety.

This application is related to U.S. patent application Ser. No. 19/296,121 entitled "Waveguide Photodiode and Monolithic Electro-Photonic Integrated Circuit Comprising a Waveguide Photodiode and Transimpedance Amplifier" filed Aug. 11, 2025 which claims the benefit of U.S. patent application No. 63/736,173, filed Dec. 19, 2024, entitled "Waveguide Photodiode And Monolithic Electro-Photonic Integrated Circuit Comprising A Waveguide Photodiode And Transimpedance Amplifier", incorporated herein by reference in its entirety.

TECHNICAL FIELD

This invention relates to electro-absorption modulators (EAMs), and electro-photonic integrated circuits comprising EAMs and driver electronics, and EAMs fabricated with an Indium Phosphide (InP)-based materials system.

BACKGROUND

Information can be encoded on to an optical carrier either by direct modulation of an optical source, such as a semiconductor laser, or by modulation of a continuous wave (CW) semiconductor laser using an external modulator.

There are multiple candidate external modulators. Electro-optic modulators are based on materials in which the real part of the refractive index changes with the application of an electric field, due to the Pockels effect or Kerr effect. Electro-absorption modulators (EAMs) are based on materials in which the imaginary part of the refractive index, or extinction coefficient, changes with application of an electric field, due to the Franz-Keldysh effect, or the Quantum Confined Stark Effect (QCSE) in a multi-quantum well (MQW) structure.

Electro-optic modulators include Mach-Zehnder Modulators (MZM), which comprise an interferometric structure made from a material with a strong electro-optic effect, such as Lithium Niobate (LiNbO3) and III-V semiconductors such as GaAs and InP. MZMs using bulk materials are used for coherent applications and for longer distance communications where chromatic dispersion is a significant impairment. A large $V_\pi^* L$ product (half-wave voltage $V_\pi^*$ device length L) inhibits low-cost deployment due to a large chip size, or large voltage. MZM structures comprising thin film lithium niobate (TFLN) offer improved performance (see Table 1 of: Chen, G., Gao, Y., Lin, H. and Danner, A. J. (2023), Compact and Efficient Thin-Film Lithium Niobate Modulators. Adv. Photonics Res., 4: 2300229. https://doi.org/10.1002/adpr.202300229). An MZM fabricated with silicon-organic hybrid (SOH), which has a high electro-optic coefficient, can provide even better optical performance than inorganic material. Chromophore research is continually improving, but SOH is not a Mainstream approach at the time of filing, e.g. due to issues of manufacturability, high temperature survivability and reliability. If an MZM type modulator works under low voltage, the modulation length is typically long, e.g. ~1 cm. Reducing the length of an MZM is a challenge, so they are generally relatively large devices (lengths in the range of mm to cm) compared to EAMs.

EAMs are much more compact than MZMs, and can be more easily integrated into electro-photonic integrated circuits. Most EAMs today rely on QCSE. For example, QCSE EAMs may have a length in the range of tens of microns to hundreds of microns, and can be operated with a drive voltage of ~2V. However, challenges remain because QCSE EAMs are non-linear, temperature dependent and wavelength dependent. The QCSE peak bias voltage V shifts with respect to temperature or wavelength detuning; to first order the peak bias shift is about the proximity of the wavelength of transmission to the effective bandgap of the QCSE MQW structure. Temperature control, e.g. thermo-electric cooling (TEC), may be required for ordinary operation.

There is a need for EAMs, and electro-photonic integrated circuits comprising EAMs, which address one or more of these challenges, or otherwise provide improved performance, particularly for applications such as high-speed optical data communications.

SUMMARY OF INVENTION

The present invention seeks to provide an electro-absorption modulator (EAM) and an optical transmitter comprising a monolithically integrated EAM and EAM driver circuit fabricated from III-V semiconductor materials, e.g. group III-V semiconductor materials, such as an Indium Phosphide (InP)-based material system comprising binary, ternary, quaternary and other compositions of In, Ga, As, P, Al and Sb, which provide for improved performance, e.g. for current and next-generation high-speed optical modulation applications.

According to an aspect of the invention there is provided a waveguide (WG)-device configured to modulate light and comprising a p type material, an i-type material and an n-type materials (a PIN waveguide), the waveguide-device comprising: a semi-insulating (SI) indium phosphide (InP) substrate; an epitaxial layer stack formed on the SI:InP substrate structured to form the PIN waveguide, the epitaxial layer stack comprising: an n-layer structure and a p-layer structure; an i-region comprising optical material having an operational wavelength range located between the n-layer structure and the p-layer structure; the n-layer structure and the p-layer structure providing a mode-shaping functionality configured to optical confine one or more modes of an optical signal configured to propagate through the i-region; wherein the mode-shaping functionality includes providing a mode-extending functionality in at least one of the n-layer structure and the p-layer structure.

In an aspect the waveguide-device is an Electro-Absorption Modulator (EAM).

In an aspect the mode-extending functionality comprises a mode-extending layer.

In an aspect the mode-extending layer comprises a quaternary material such as materials fabricated with group III-V semiconductor materials, including an Indium Phosphide (InP)-based material system comprising and other compositions of In, Ga, As, P, Al and Sb.

In an aspect the mode-extending layer comprises one of: an n-type layer in the n-layer structure: a p-type layer in the p-layer structure; or a p-type layer in the p-layer structure and an n-type layer in the n-layer structure.

In an aspect the i-region comprises an absorption material.

In an aspect the i-region comprises InGaAs or a quaternary absorption material selected within the InP-based materials system.

In an aspect the absorption material comprises a Quantum Confined Stark Effect (QCSE) multi-quantum well (MQW) structure comprising N wells and N−1 barriers.

In an aspect the MQW structure comprises InGaAsAl or InGaAsP.

In an aspect N is between ≥8 and <24.

In an aspect the well thickness, the barrier thickness and N are selected to provide a thickness d of the i-region which is close to a transit time limit of the i-region.

In an aspect a ratio of the barrier thickness to well thickness is 1:1 to <1:1 and preferably 6:10, and the barrier thickness and the well thickness are in a range of 9 nm to 11 nm.

In an aspect the mode-extending functionality is provided by balancing one or more parameters of the waveguide device.

In an aspect one or more parameters of the waveguide device comprise two or more of: parameters of a compositions, size, materials or doping of the epitaxial layer stack; inclusion of one or more mode-shaping structures; an extinction ratio; inclusion of one or more mode-extending layer; inclusion of one or more separate confinement heterostructure (SCH) layers; defining a refractive index of each layer of the epitaxial layer stack selecting processing from MBE. MOCVD, or any other process; balancing fall-off of voltage and/or electric field profile over a length of the i-region; balancing a width of the i-region relative to the width of the waveguide device; a transit time of the carriers (holes or electrons as the case may be); a difference between the transit times of holes and electrons; balancing a thickness d of the i-region and the transit time, grading of one or more layers of the epitaxial layer stack; inclusion of multi-quantum well MQW material and where used, balancing a number of wells and barriers and a ratio of thicknesses of wells to barriers; providing an undercut to the i-region for reducing the width of the i-region relative to the width of the ridge of the waveguide, e.g. to reduce capacitance; balancing an absorption length of the i-region with a RC value thereof; balancing one or more parameter to accommodate absorption of a single mode or multiple modes in the i-region; balancing a waveguide width, waveguide length and thickness of the i-region to provide a quantum efficiency (QE) of between ≥80% and (QE) ≥90% over a required operational wavelength range; balancing a waveguide width, waveguide length and thickness of the i-region to provide a capacitance of ≤0.70 fF/µm of length; and wherein the waveguide is a ridge waveguide having a ridge width and a ridge length, and the i-region has a waveguide width which is less that the ridge width.

In an aspect a width of the i-region is tapered, having a first width at an optical input and narrowing to a second width at a back facet of the waveguide-device.

In an aspect the waveguide is made from waveguide materials and dimensions selected to provide one or more of the following: a dynamic extinction ratio (ER) of ≥5 dB; a device capacitance of ≤0.85 fF/µm and preferably ≤0.70 fF/µm.

In an aspect there is provided an optical device comprising a waveguide-device according another aspect and further comprising a monolithically integrated first plurality of layers of the epitaxial layer stack forming at least one electronic device.

In an aspect the waveguide-device is an electro-absorption modulator (EAM).

In an aspect the at least one electronic device comprises an electro-absorption modulator (EAM) driver circuit.

In an aspect the optical device is a transmitter.

In an aspect the EAM driver circuit comprises one or more InP heterojunction bipolar transistors (HBTs) formed by a first plurality of layers of the epitaxial layer stack formed on the SI InP substrate and the waveguide-device is formed by a second plurality of semiconductor layers overlying the first plurality of semiconductor layers.

In an aspect the EAM driver circuit is electrically interconnected by conductive traces to contact layers of the EAM.

In an aspect a spacer comprising one or more intermediate layers between the first plurality of semiconductor layers and the second plurality of semiconductor layers.

In an aspect the spacer comprises a semi-insulating layer.

In an aspect the EAM driver circuit is formed on a first area of the substrate, and the EAM is provided on an adjacent area, and comprising an isolation region electrically isolating the first plurality of semiconductor layers of the first area from the first plurality of semiconductor layers of the adjacent area.

In an aspect there is provided an optical system comprising an optical device of another aspect.

In an aspect comprising two or more optical devices.

In an aspect an optical device operating as a transmitter and one or more optical devices acting as a receiver.

In an aspect there is provided a method of manufacturing a waveguide-device comprising a p type material, an i-type material and an n-type materials (a PIN waveguide) of another aspect, comprising: forming an epitaxial layer stack on a semi-insulating (SI) indium phosphide (InP) substrate and structured to form the PIN waveguide, the method comprising: forming an n-layer structure and a p-layer structure; and forming an i-region comprising optical material having an operational wavelength range located between the n-layer structure and the p-layer structure; wherein the n-layer structure and the p-layer structure provide a mode-shaping functionality configured to optical confine one or more modes of an optical signal configured to propagate through the i-region; and wherein the mode-shaping functionality includes providing a mode-extending functionality in at least one of the n-layer structure and the p-layer structure.

Aspects of the invention further provide an electro-absorption modulator comprising:

a semi-insulating (SI) indium phosphide (InP) substrate;

an epitaxial layer stack formed on the SI:InP substrate structured to form a ridge waveguide of the EAM, the epitaxial layer stack comprising:

an n-contact layer;

an n-cladding;

an i-region comprising optical absorption material, e.g. a Quantum Confined Stark Effect (QCSE) Multi-Quantum Well (MQW) structure, for an operational wavelength range;

a p-cladding;

a p-contact layer; and an n-metal contact on the n-contact layer, and a p-metal contact layer on the p-contact layer;

wherein the p-cladding comprises a first mode shaping section comprising a p-InP spacer layer and the n-cladding comprises a second mode-shaping section comprising an n-InP spacer layer; and at least one of first mode shaping section and the second mode shaping section comprises a mode-extending layer, the mode-extending layer having a refractive index less than the refractive index of the absorption material of the i-region and greater than the refractive index of the InP spacer layers.

For example, one aspect provides an electro-absorption modulator comprising:

a semi-insulating (SI) indium phosphide (InP) substrate;

an epitaxial layer stack formed on the SI:InP substrate structured to form a ridge waveguide of the EAM, the epitaxial layer stack comprising:

an n-layer an i-region comprising optical absorption material for an operational wavelength range;

a p-layer;

the n-layer being a multi-layer structure comprising a first mode-shaping section;

the p-layer being a multi-layer structure comprising a second mode-shaping section.

In example embodiments, the i-region of the EAM comprises a Quantum Confined Stark Effect (QCSE) Multi-Quantum Well (MQW) structure. The MQW structure comprises N wells and N–1 barrier layers where the number N, the well thickness, the barrier thickness, and the ratio of the well thickness to barrier thickness, provide a thickness d of the i-region which provides a required dynamic extinction ratio and is within a transit time limit of the i-region. The EAM waveguide comprises upper and lower mode shaping-sections to facilitate optical coupling. The waveguide geometry and dimensions are selected to reduce the device capacitance per unit length, and provide a required dynamic extinction ratio, e.g. provide a capacitance of ≤0.70 fF/μm, and a dynamic extinction ratio ≥5 dB.

A second aspect provides an electro-absorption modulator comprising:

a semi-insulating (SI) indium phosphide (InP) substrate;

an epitaxial layer stack formed on the SI:InP substrate structured to form a ridge waveguide of the EAM, the epitaxial layer stack comprising:

an n-contact layer comprising n-InGaAs;

a first mode shaping-section comprising an n-InP spacer layer a first separate confinement heterostructure;

an i-region comprising optical absorption material for an operational wavelength range;

a second separate confinement heterostructure;

a second mode-shaping section comprising: a mode-extending layer comprising a p-type quaternary material having a refractive index greater than the refractive index of InP and less than the refractive index of the i-region, and a p-InP spacer layer on the mode-extending layer;

an overlying p-contact layer; and an n-metal contact on the n-contact layer, and a p-metal contact layer on the p-contact layer.

A third aspect provides an electro-absorption modulator comprising:

a semi-insulating (SI) indium phosphide (InP) substrate;

an epitaxial layer stack formed on the SI:InP substrate structured to form a ridge waveguide of the EAM, the epitaxial layer stack comprising:

a p-contact layer comprising p-InGaAs;

a first mode shaping-section comprising a p-InP spacer layer a first separate confinement heterostructure;

an i-region comprising optical absorption material for an operational wavelength range;

a second separate confinement heterostructure;

a second mode-shaping section comprising: a mode-extending layer comprising a p-type quaternary material having a refractive index greater than the refractive index of InP and less than the refractive index of the i-region, and an n-InP spacer layer on the mode-extending layer;

an overlying n-contact layer; and a p-metal contact on the p-contact layer, and an n-metal contact layer on the n-contact layer.

In example embodiments, the absorption material of the i-region comprises a Quantum Confined Stark Effect (QCSE) multi-quantum well (MQW) structure comprising N wells and N–1 barriers. For example, the MQW structure comprises InGaAsAl.

In MQW structures of example embodiments, N is ≥8, and in some embodiments, N is increased to ≥13 or ≥16 to provide increased absorption. For example, the well thickness, the barrier thickness and N are selected to provide a thickness d of the i-region which is below or close to a transit time limit of the i-region, so that the bandwidth is not transit time limited. In some embodiments, the ratio of the barrier thickness to well thickness is 1:1, and the barrier thickness and well thickness are in a range of 9 nm to 11 nm. In other embodiments, a ratio of the barrier thickness to well thickness is <1:1, for example, a ratio of the barrier thickness to well thickness is 6:10, e.g. 6 nm barrier thickness and 10 nm well thickness.

Since the bandwidth is not transit time limited, but RC limited, the geometry and dimensions of the ridge may be selected to reduce the device capacitance, for fast response, while providing a required dynamic extinction ratio. For example, ridge of the EAM waveguide has a width and a length, and the i-region has a waveguide width which is less that the width of the ridge, e.g. the i-region is undercut to provide said waveguide width which is less than the width of the ridge.

In example embodiments, the EAM waveguide materials and dimensions may be selected to provide one or more of the following: a dynamic extinction ratio (ER) of ≥5 dB; a device capacitance of ≤0.85 fF/μm, and preferably ≤0.70 fF/μm. For example, for an EAM having a length of 50 μm, the device capacitance is <50 fF or <40 fF.

External contact pads are provided on the SI:InP substrate.

Another aspect provides a monolithic electro-photonic integrated circuit comprising an electro-absorption modulator EAM and an EAM driver circuit comprising:
  an epitaxial layer stack is formed on a semi-insulating (SI) indium phosphide (InP);
  the EAM driver circuit comprises InP heterojunction bipolar transistors (HBTs) formed by a first plurality of layers of the epitaxial layer stack formed on the SI InP substrate; and
  the EAM comprises an EAM waveguide structure as defined herein, the EAM waveguide being formed by a second plurality of semiconductor layers of the epitaxial layer stack overlying the first plurality of semiconductor layers, comprising said n-contact layer, i-region and p-contact layer; and
  the EAM driver circuit is electrically interconnected by conductive traces to contact layers of the EAM.

The epitaxial layer structure may comprise a spacer comprising one or more intermediate layers between the first plurality of semiconductor layers and the second plurality of semiconductor layers. For example, the spacer comprises a semi-insulating layer.

The EAM driver circuit is formed on a first area of the substrate, and the EAM is provided on an adjacent area, and comprises an isolation region laterally electrically isolating the first plurality of semiconductor layers of the first area from the first plurality of semiconductor layers of the adjacent area.

Thus, EAMs and monolithic electro-photonic integrated circuits, comprising an EAM and an EAM driver circuit, of example embodiments are disclosed, which offer improved performance, particularly for applications such as high-speed optical data communications.

BRIEF DESCRIPTION OF THE DRAWINGS

FIG. 6 shows an example eye-diagram for 224 GB, 448 Gb/s PAM4 modulation;

FIG. 12 is a simplified cross-sectional view of an epitaxial layer structure for fabrication of a monolithic electro-photonic circuit comprising an EAM waveguide and driver electronics comprising InP HBTs, according to an aspect of the invention;

FIG. 13 is a simplified schematic view of a monolithic electro-photonic integrated circuit comprising an EAM and EAM driver electronics of an example device topology, according to an aspect of the invention;

FIG. 20 is a schematic cross-sectional view of the input facet of the passive waveguide shown in FIG. 19;

FIG. 21 is a schematic cross-sectional view of the active EAM waveguide shown in FIG. 19;

The foregoing and other features, aspects and advantages will be more apparent from the following detailed description, taken in conjunction with the accompanying drawings, of example embodiments, which description is by way of example only. In general, like reference number refer to similar features. In some cases, a features may have different reference numbers in different figures. This is not intended to suggest the features are different but is used for convenience in individual figure. All reference numbers are used merely to aid understanding.

DETAILED DESCRIPTION

Figure 1:
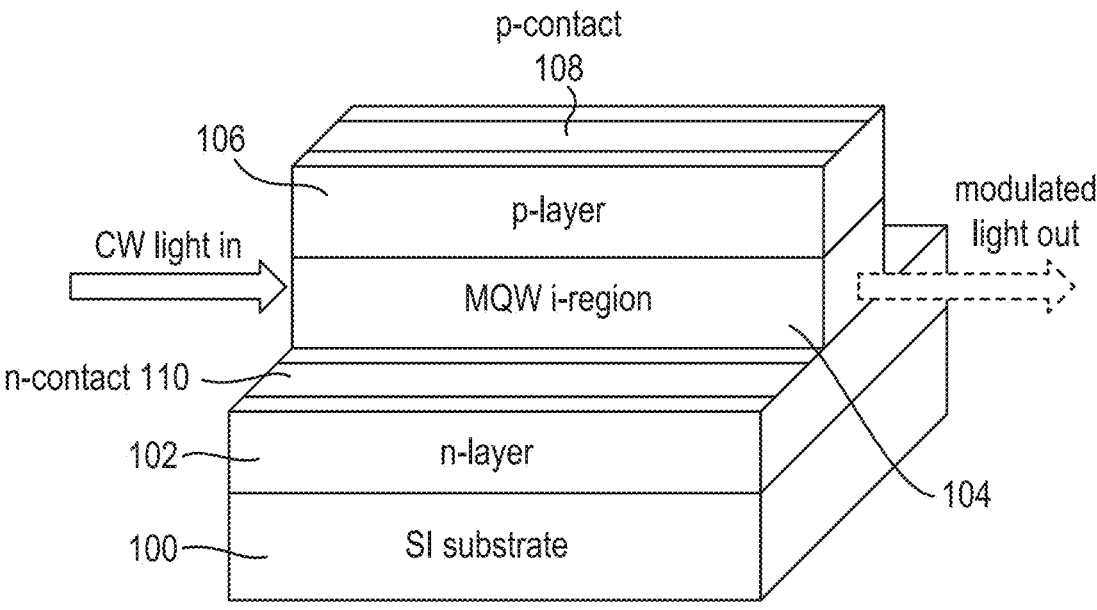
FIG. 1 is a simplified schematic diagram of an EAM formed on a semi-insulating (SI) substrate comprising an n-layer, an MQW i-region and a p-layer, according to an aspect of the invention.
Figure 2:
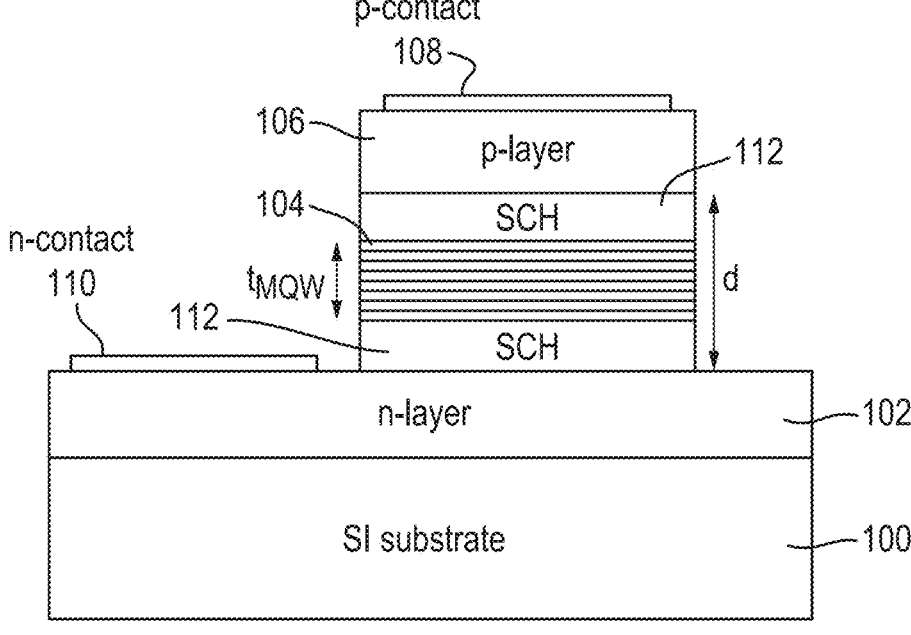
FIG. 2 is a simplified schematic cross-sectional diagram of an EAM formed on a semi-insulating (SI) substrate comprising an n-layer, an MQW i-region and a p-layer, according to an aspect of the invention.

FIG. 1 is a simplified schematic diagram of an EAM comprising by way of example a ridge waveguide, formed on a semi-insulating (SI) substrate 100, comprising an n-layer 102, an i-region 104, such as an MQW i-region, and a p-layer 106. In this example the p-layer is on top with a p-contact 108 on top of the ridge, and n-contact 110 on the n-layer each side of the ridge (only one is shown). FIG. 2 is a simplified schematic cross-sectional diagram of an EAM formed on a semi-insulating (SI) 100 substrate comprising the n-layer 102, the i-region 104 and the p-layer 106. The EAM may also include optional separate containment heterostructure (SCH) layers 112. The function of these SCH layers is further described below.

Figures 3, 4:
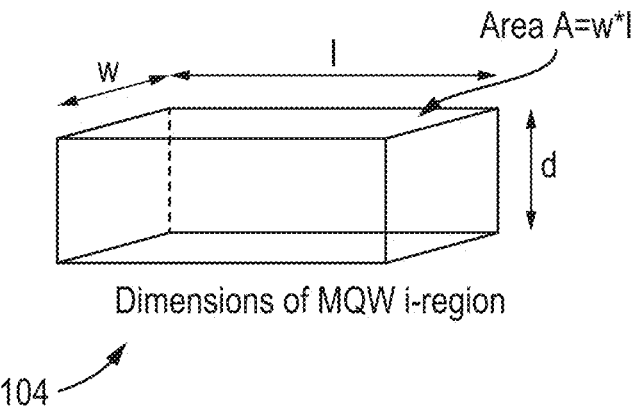
FIG. 3 is a schematic diagram identifying dimensions of the MQW i-region of the EAM shown schematically in FIG. 1 and FIG. 2.
FIG. 4 explains how some device parameters are related, according to an aspect of the invention.

FIG. 3 shows a schematic diagram identifying dimensions of the i-region of the EAM shown schematically in FIG. 1 and FIG. 2. FIG. 4 explains how some device parameters are related. Neglecting fringe capacitance (which is usually very small), the intrinsic capacitance $C_{intrinsic}$ of the waveguide is dependent on the length l, width w, thickness d, A is the area of the i-region and e is permittivity of the active absorption region. $C_{intrinsic}$ is given by the equation:

$$C_{intrinsic} = eA/d = e^* w^* l/d$$

The device capacitance $C_{device}$ includes the pad capacitance $C_{pad}$. The 3 dB RC limited EAM bandwidth is given by $f_{3dB}=1/(2\pi RC)$, where R is the device resistance in _$\Omega$ and C is the device capacitance also referred to as $C_{device}$. The transit time $t_{tr}=d/v$ where v is the velocity of the carriers (holes or electrons). It is noted that holes and electrons each travel at different velocities and the transit time may comprise an average based on the carrier velocity of holes and electrons. The average may be varied in a number of ways and may form parameters which can be balanced in the determination of the design requirements of the waveguide device.

Light into a device may comprise multiple modes. For example, a first order optical mode may have mode shape that has a Gaussian intensity profile, e.g. a circular or elliptical mode-shape including a central high intensity peak which diminishes radially, as is well known. Higher order modes have other mode shapes or patterns which may comprise multiple intensity peaks. Particularly in high-speed, low profile (size) devices ensuring as much light as possible, including multiple optical modes, is received and captured in the device is an ongoing challenge. The ability to maximize the amount of light captured whilst preserving other operational parameters is important. The intensity (I) is given by the following formula:

$$I = \sum_{n=0}^{\infty}(I_n\exp(-\Gamma_n\gamma_{abs}l))$$

For non-bound modes $$\Gamma_n \approx 0$$

The max QE then becomes.

$$QE = \frac{\sum_{n=0}^{\infty}(I_n\exp(-\Gamma_n\gamma_{abs,n}l))}{\sum_{n=0}^{\infty}I_n}$$

Where n is the mode and the variables are as stated below.

In developing their devices, the Applicant has determined that there are many parameters that may be balanced and optimized to achieve the performance required for EAMs for use at 448 Gb/s in examples. One of these is the use of a mode shaping section, e.g. 616 and 622 shown in FIG. 5, and which may comprise a mode-extending layer (e.g. layers 624*a*/624*b* described in more detail with reference to device structures of example aspect of the invention shown in FIG. 5, and FIGS. 7 to 10) which is provided and located to optimize the light received in the main or any ancillary modes of light in from the fiber. As mentioned above the central peak of the primary mode (also known as the first order mode or fundamental mode) may be accompanied by other light from higher order modes. By including the mode-extending layer the amount of light transmitted from the primary mode and higher order modes can be increased while not compromising others of the operating parameters which are required for high-speed operation. Other parameters may also be varied alone or in combination with use of the mode-extending layer as will now be described.

In order to maximize the responsivity (light transmitted) and ensure other parameters are not adversely impacted by this primary objective a number of different parameters can be adjusted to provide optimal operation of an EAM or equivalent for high-speed application. For a single mode, the variables which may influence the performance and design of the design can be summed up by the following equation:

$$(f_{3dB})^{-2} = \left[\left(\frac{2\pi R_\Omega\epsilon \; w_{WG}l}{d}\right)^2 + \left(\frac{d}{0.443*v_{avg}}\right)^2\right]$$

Where $f_{3dB}$ refers to cutoff frequency of the device (i.e. where the device ceases to operate at an optimal performance); $w_{WG}$ refer to width of the waveguide; QE is the quantum efficiency of the EAM (and provides the proportion or percentage of light absorbed in the absorption layer); $R_\Omega$ is the ohmic resistance of the device; $v_{avg}$ is the average velocity of the carriers; $\Gamma$ is the mode overlap; $\gamma_{abs}$ is the absorption coefficient ($\mu$m-1). For a single mode this can be used to calculate the quantum efficiency and the length of the i-region as follows:

$$QE = 1 - \exp(-\Gamma\gamma_{abs}l)$$

$$\therefore l = -\frac{\ln(1 - QE)}{\Gamma\gamma_{abs}}$$

This can be similarly denoted to the nth mode as follows:

$$QE_n = 1 - \exp(-\Gamma_n\gamma_{abs,n}l)$$

Where $QE_n$ is the quantum efficiency or responsivity of the device of modes n; and $\Gamma_n$ is the mode overlap for the nth mode. As a result, the ideal length of the i-region can be determined of each mode and then optimized for all relevant modes that may be captured. Unlike a photodiode, in which it may be advantageous to absorb all the modes, an ideal EAM would be constructed so as to couple primarily the mode of interest from the input to the EAM, and therefore from the EAM to the output.

Typically, the thickness d does not include the thickness of any SCH layers and just specifies the thickness of the i-region. In the Figs d is generally shown as the thickness between the first-type material (p or n) and the second type material (respectively n or p). Where there is an SCH on either side of the i-region d is intended to be construed to exclude the SCH. It is possible that the SCH layers can be used to fine tune the waveguide thicknesses/dimensions, or to grade the doping between the i-region and the n and p layers. As such d could be interpreted to include or exclude the SCH layers.

From the above equations it is clear that there are many variables that could influence the performance of the device. These include the variables in the above equations, the materials and any doping or shaping thereof as well as the shape and size of each layer that leads to interactions which further influence the performance of the device. No one variable is likely to lead to optimal performance, instead there are many degrees of freedom or parameters based on individual ones of the variables and it is by varying the degrees of freedom that an optimal device design can be arrived at for a specific application or device specification.

For the purposes of this application the variables or parameters are sometimes referred to as degrees of freedom, as some of them may be intrinsic as a result of the combinations of dimensions, materials, doping and the like and can be achieved through different so-called combinations of variables or parameters. For example, the length and doping of the intrinsic layer may be linked, and thus changing one intrinsically causes a change in the requirements for the other. So, balancing the two together may require the management of one or two degrees of freedom depending on the relationship between the variables or parameters. In another example the balance between the area and thickness of the i-region and the intrinsic capacitance are linked, optimizing one may be detrimental to the other. Having a thicker i-region increases the mode size of this region. At the same time the carrier transit time and capacitance are increased, which may be non-optimal. It is clear that the balance between the two relates to two degrees of freedom which are to be balanced (optionally along with others) to design a device having strong mode confinement and coupling whilst not increasing the transit time to unacceptable levels. It is noted that this may further be related to the number of other variable or parameters as described elsewhere.

For the avoidance of doubt degrees of freedom for the design of a high-speed device having optimal performance, include, but are not limited to, at least the following parameters (in no particular order):

The variables defined in the equations;

The nature of the device layers including their compositions, materials, doping and the like;

The nature, size and materials of the absorption region;

The mode-shaping structure or structures;

The mode-extending layer including the nature, size, position and materials thereof;

Mode confinement structures used to confine the light into certain layers of structures, for example cladding, spacers and the like;

The presence and absence of SCH layers;

The level of doping in any region of interest (for example, in the mode-extension structures and the mode-confinement structures);

The refractive indices of each layer, for example, of the mode-extension structures and the mode-confinement structures relative to the i-region;

The epitaxial growth process, for example MBE. MOCVD, or any other process;

The manufacturing process, for example photolithography, deposition equipment/technique, etching equipment/technique, or any other process;

The fall-off of voltage and electric field profile over the length of the intrinsic region;

The width of absorption region relative to the width of the waveguide;

The transit time of the carriers (holes and/or electrons as the case may be);

A thickness d of the i-region determines the carrier transit time, and is related to a transit time limit of the i-region;

Grading of certain layers of interest to provide smoothing of changes in one or more variable;

Whether MQWs are used and then the numbers of wells and barriers and the ratio of thicknesses of wells to barriers;

An extinction ratio;

Undercutting of the absorption region or i-region for reducing the width of the i-region relative to the width of the ridge of the waveguide, e.g. to reduce capacitance;

Balancing the absorption length of the i-region with the RC value thereof;

Variable doping of layers for grading and balancing;

The ability to accommodate a single mode and multiple modes as required and as available based on the "mode-capacity" of the i-region; and The variation in the transit time of holes and electrons.

By careful selection and control of the degrees of freedom the Applicant has been able to design a high speed WG PIN for use as an EAM which can outperform all currently available alternatives in the market. A plurality of degrees of freedom are determined, which are combined to give rise to an optimal device structure. One or more of the plurality of degrees of freedom are selected based on the required performance criteria or parameters of interest. Different situations and uses may provoke a different one or ones of the plurality of degrees of freedom being selected. The improvement margins are of the order of the order of a factor of two for a figure of merit based on quantum efficiency (QE) and bandwidth. The term balancing used herein with reference to the degrees of freedom or parameters, is not intended to relate to equality but instead the balance of one degree of freedom being arranged to be optimal without being unduly detrimental to any other degree of freedom. Selecting one or more of the plurality of degrees of freedom and then balancing the selected ones is not a trivial operation. Instead, it takes inventive merit to combine and balance the degrees of freedom to both work and more importantly work in an effective and efficient manner.

As with all designs for devices, optimal performance comes from judicious control of the device parameters and variables (or the one or more degrees of freedom for the design). At least some of the determinations that a particular device parameter; variable or degree of freedom for the design is important comes from "testing" the design and then varying the parameter, variable or degree of freedom. One area where this has proved to be of interest is the management of multiple modes.

In a typical situation where a WG PIN EAM is used as in optical transmitter, the WG EAM generates a high speed modulated optical signal from a laser input to produce a transmission signal for carrying data, e.g. via an optical fiber or on-chip waveguide. The modulated optical signal may generate a single mode or multiple optical modes by modulating light from one or more laser sources. The light is output and later captured at an optical receiver by a WG PD and converted to photocurrent, which is output as high speed modulated electrical signal to a transimpedance amplifier (TIA) in an example.

For optimal performance of an EAM, it is good for the quantum efficiency (QE) of the device to be as close to 1 as possible. A QE of 1 or responsivity close to 100% means that all light received is guided into the active region of the EAM. In practice is desirable that the QE or responsivity is close to 1, so that a high proportion or incident light is passed through the active region of the EAM and the overall intensity of light in the waveguide is a maximized. A high quantum efficiency is one of the conditions necessary for efficiency and high-speed performance. The QE may be enhanced by designing the EAM to support one bound optical mode of interest over other modes. Accordingly, one of the considerations used in designing and building the optimal EAM device is to consider the absorption and transmission of light in the mode of interest. The dynamic extinction ratio depends on the difference in transmission between the on-state and off-state (i.e. 0 or 1 for simple modulation, or e.g. 0, $\frac{1}{3}$, $\frac{2}{3}$ and 1 for PAM 4) based on the electrical modulation signal driving the EAM. There may be parasitic losses—insertion losses, metallization losses, etc., but otherwise what is not absorbed is transmitted, and vice versa, In the context of the present application, high-speed relates to operating devices at speeds required in optical communications that are destined for use in, for example, high-speed modulation schemes such as 224 Gb/s, 336 Gb/s and 448 Gb/s PAM4 modulation applications and the like. Further the devices may be used for applications using wavelength division multiplexing (WDM) comprising optical signals of multiple wavelengths which are multiplexed onto a single optical fiber, for example, using multiple wavelengths in the O-band, L-band and C-band wavelength ranges. WDM networks include e.g. high-speed optical data interconnects for data centers, which may be short range optical interconnects within a data center, or longer-range optical interconnects between data centers, 5G network optical communications and other similar forms of transmission and reception technique. For example, 10 Gigabit-capable PON may be referred to as 10G-PON or XG-PON. Recommendation ITU-T G.987 is a family of documents that define this access network standard. Simultaneous upstream and downstream transmission over the same fiber is made possible through wavelength division multiplexing (WDM). This technology allows one PON wavelength transmission for upstream and another for downstream. For example, 10G-PON uses 1577 nm for downstream and 1270 nm for upstream.

Figure 5:
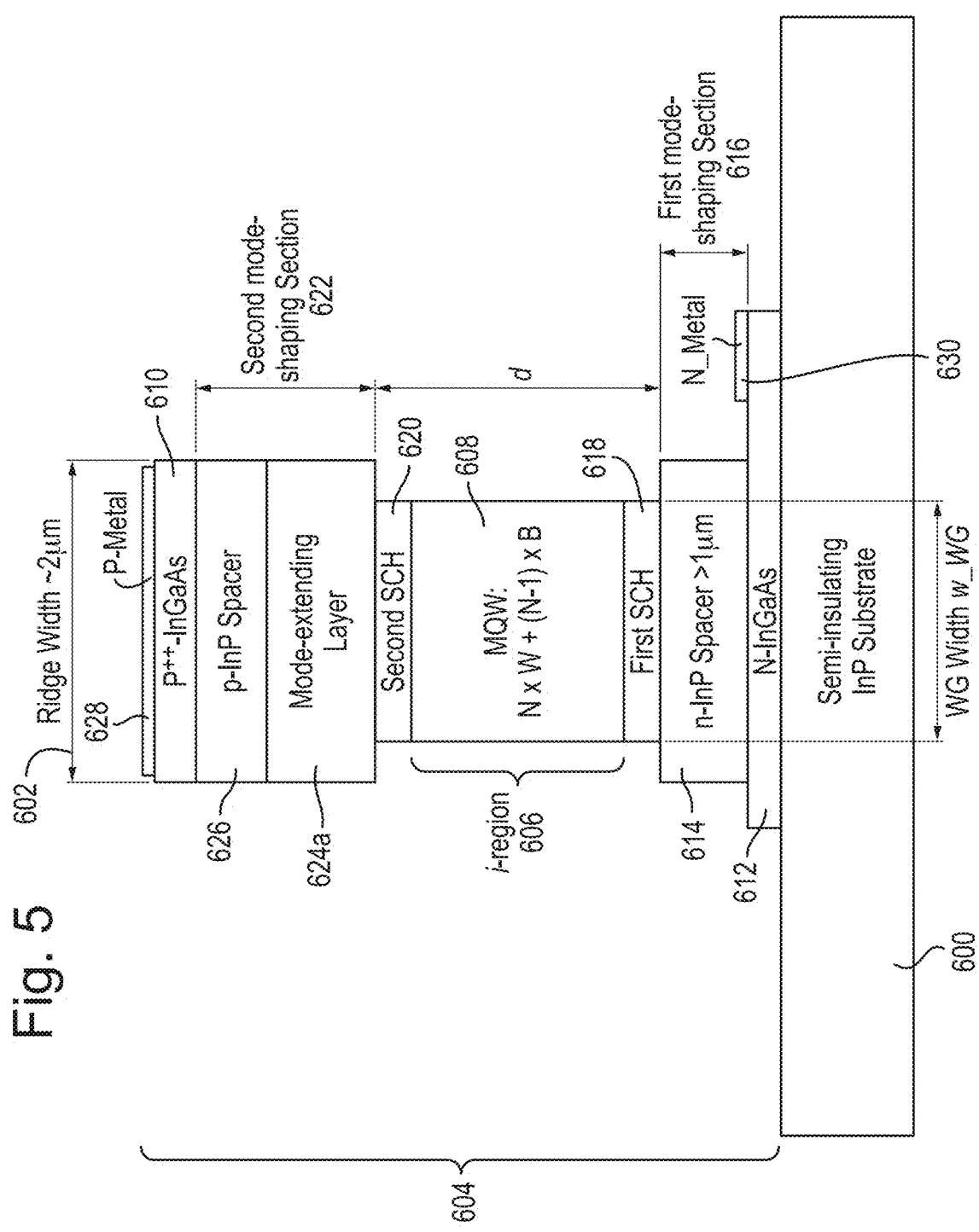
FIG. 5 is a simplified schematic cross-sectional view of waveguide device such as an EAM of an embodiment wherein the EAM comprises upper and lower mode shaping sections, and the i-region comprises a MQW structure of N wells (W) and N−1 barrier layers (B), which is denoted by "N×W+(N−1)×B", according to an aspect of the invention.

FIG. 5 shows a simplified schematic cross-sectional view of an EAM of an embodiment wherein the i-region comprises an MQW structure of N wells (W) and N−1 barrier layers (B), which is denoted by "N×W+(N−1)×B" 608, and the EAM comprises upper (second) 622 and lower (first) 616 mode-shaping sections. The device structure comprises a semi-insulating (SI) InP substrate 600. An epitaxial layer structure 604 is formed on the SI substrate 600. The epitaxial layer structure 604 comprises an InP-based materials system or any other group III-V semiconductor materials, such as an Indium Phosphide (InP)-based material system comprising binary, ternary, quaternary and other compositions of In, Ga, As, P, Al and Sb. In this example, the n-layer is on the bottom and the p-layer is on top. The n-layer is a multi-layer structure comprising a layer of N-InGaAs 612, and an n-InP spacer layer 614 which acts as a lower mode-shaping section. The MQW structure of the i-region is sandwiched between optional upper and lower separate containment heterostructures (SCH). The p-layer is a multi-layer structure 622 comprising a mode-extending layer 624a, a p-InP spacer layer 626 and a P++ InGaAs contact layer 610. A p-contact metal layer 628 is provided on the P++ InGaAs layer 610 and an n-contact metal layer 630 is provided on the N-InGaAs layer 612.

The thickness d of the i-region depends on the number of wells N, and the thickness d and number of wells N of the MQW structure can be increased to increase absorption, up to a transit time limit. The ratio of the thickness of the wells and the thickness of the barrier layers may be 1:1, each having a thickness of ~10 nm, e.g. in a range from about 9 nm to about 11 nm. Increasing the thickness of the wells relative to the thickness of the barriers may also improve performance. In one embodiment the ratio of the thickness of the wells relative to the thickness of the barriers is 10:6, e.g. 10 nm wells and 6 nm barriers. As illustrated schematically, the width of the i-region of the EAM waveguide is narrower than the upper width of the ridge. For example, the i-region may be undercut relative to the width of the ridge. Reducing the width of the active absorption region or the i-region reduces capacitance per unit length. Upper and lower mode-shaping sections extend the optical mode vertically, which allows for reducing the EAM waveguide width in the i-region while preserving the extinction ratio. For example, the width of the ridge may be in the range from 2 µm to 3 µm, e.g. 2.3 µm to 2.5 µm, and the width of the i-region may be undercut by 0.25 µm to 0.5 µm each side. The width of the ridge waveguide may be tapered along its length, for example the width of the ridge may narrow along its length from the optical input to the optical output. To increase the f_3 dB bandwidth, it may be desirable to reduce the width of the i-region to provide a lower intrinsic capacitance per unit length, e.g. ≤0.85 fF/µm or preferably ≤0.70 fF/µm. For example, for an EAM having a length of 50 µm, the device capacitance is <50 fF or <40 fF.

The mode-shaping sections 616 and 622 extend the optical mode vertically to reduce parasitic insertion loss, e.g. to improve optical coupling to the waveguide, and mode-shaping can also reduce metallization losses. The lower mode-shaping section 616 includes a spacer layer of n-InP having a thickness of at least 1 μm. Typically, spacer layers are relatively thin. However, in the present invention they are thicker than a typical spacer layer. This provides additional guidance to the light beam towards the absorption region rather than passing into the contact layers as might be the case with thinner spacer layers. This provides another one of the degrees of freedom mentioned in greater detail below. The upper mode-shaping section 622 comprises a layer of mode-extending layer 624a and a p-InP spacer layer 626. The mode extending layer may comprise a material having a refractive index between the refractive index of InP and the effective refractive index of an i-region. The material may be a quaternary material. For example, if the MQWs comprise an InGaAsAl MQW structure having an effective refractive index in a range of 3.3-3.4, e.g. 3.35, and the spacer layer of InP has a refractive index of e.g. 3.21, the mode-extending layer 624a of the upper mode-shaping section 622 may comprise InGaAsP having a refractive index in the range 3.28 to 3.30. The thickness of the upper mode-extending layer may be about e.g. 0.8 μm.

TABLE 1 shows some comparative data for some example EAMs for 56 GB, 112 Gb/s PAM4 modulation applications.

| | This work 8MQW | This work 13MQW | Other sources |
|---|---|---|---|
| | SI substrate | SI substrate | Typical n+ substrate |
| | 8MQW | 13MQW | 8MQW |
| C_pad (fF) (1) | 11.0 | 11.0 | 30.0 |
| ER/100 μm (dB) (2) | 9.2 | 13.1 | 9.2 |
| Fraction of absorption within Vpp (3) | 0.5 | 0.5 | 0.5 |
| ER/100 μm (dB) Vpp static (2) | 9.2 | 13.1 | 19.2 |
| Application | 112 Gb/s PAM4, 56 GB | | |
| f_3dB min target for Nyquist limit (GHz) | 28 | | |
| Max C_total (fF) | 189.5 | | |
| R_eff (Ω) | 30.0 | | |
| Vpp | 1.2 | | |
| Device C (fF/μm) (4) | 0.85 | 0.85 | 0.85 |
| Max_C_EAM intrinsic possible (5) | 178.5 | 178.5 | 159.5 |
| f_3dB EAM needed (6, 7) | 29.7 | 29.7 | 33.3 |
| Max device length (μm) (8) | 210.0 | 210.0 | 187.6 |
| DC absorption for Vpp (dB) (9) | 19.27 | 27.42 | 17.22 |
| Single pole S21 response at Nyquist freq (dB) | −2.20 | −2.20 | −2.01 |
| RF ER (dB) (10) | 17.07 | 25.22 | 15.21 |
| Legend: | Good ER | Marginal ER | Poor ER |
| Min acceptable ER (dB) | 3.5 | | |
| Typical needed ER (dB) | 5 | | |

TABLE 2 shows some comparative data for some example EAMs for 112 GB, 224 Gb/s PAM4 modulation applications.

| | This work 8MQW | This work 13MQW | Other sources |
|---|---|---|---|
| | SI substrate | SI substrate | Typical n+ substrate |
| | 8MQW | 13MQW | 8MQW |
| C_pad (fF) (1) | 11.0 | 11.0 | 30.0 |
| ER/100 μm (dB) (2) | 9.2 | 13.1 | 9.2 |
| Fraction of absorption within Vpp (3) | 0.5 | 0.5 | 0.5 |
| ER/100 μm (dB) Vpp static (2) | 9.2 | 13.1 | 9.2 |
| Application | 224 Gb/s PAM4, 112 GB | | |
| f_3dB min target for Nyquist limit (GHz) | 56 | | |
| Max C_total (fF) | 87.4 | | |
| R_eff (Ω) | 32.5 | | |
| Vpp | 1.2 | | |
| Device C (fF/μm) (4) | 0.85 | 0.85 | 0.85 |
| Max_C_EAM intrinsic possible (5) | 76.4 | 76.4 | 57.4 |
| f_3dB EAM needed (6, 7) | 64.1 | 64.1 | 85.2 |
| Max device length (μm) (8) | 89.9 | 89.9 | 67.6 |
| DC absorption for Vpp (dB) (9) | 8.25 | 11.74 | 6.20 |
| Single pole S21 response at Nyquist freq (dB) | −2.07 | −2.07 | −1.64 |
| RF ER (dB) (10) | 6.18 | 9.67 | 4.56 |
| Legend: | Good ER | Marginal ER | Poor ER |
| Min acceptable ER (dB) | 3.5 | | |
| Typical needed ER (dB) | 5 | | |

TABLE 3

| | This work 8MQW SI substrate 8MQW | This work 13MQW SI substrate 13MQW | This work 16MQW SI substrate 16MQW | Other sources Typical n + substrate 8MQW | This work 8MQW SI substrate 8MQW | This work 13MQW SI substrate 13MQW | Other sources Typical n + substrate 8MQW |
|---|---|---|---|---|---|---|---|
| | | | | shows some comparative data for some example EAMs for 224 GB, 448 Gb/s PAM4 modulation applications. | | | |
| C_pad (fF) (1) | 11.0 | 11.0 | 11.0 | 30 | 11.0 | 11.0 | 30 |
| ER/100 μm (dB) (2) | 8.7 | 13.1 | 15.7 | 8.7 | 8.5 | 12.8 | 8.5 |
| Fraction of absorption within Vpp (3) | 0.625 | 0.625 | 0.625 | 0.625 | 0.5 | 0.5 | 0.5 |
| ER/100 μm (dB) Vpp static (2) | 10.9 | 16.3 | 19.6 | 10.9 | 8.5 | 12.8 | 8.5 |
| Application | | | 448 Gb/s PAM4, 224 GB | | | | |
| f_3dB min target for Nyquist limit (GHz) | | | 112 | | | | |
| Max C_total (fF) | | | 40.6 | | | | |
| R_eff (Ω) | | | 35.0 | | | | |
| Vpp | | | 0.8 | | | | |
| Device C (fF/μm) (4) | 0.70 | 0.70 | 0.70 | 0.70 | 0.85 | 0.85 | 0.85 |
| Max_C_EAM intrinsic possible (5) | 29.6 | 29.6 | 29.6 | 10.6 | 29.6 | 29.6 | 10.6 |
| f_3dB EAM needed (6, 7) | 153.6 | 153.6 | 153.6 | 429.0 | 153.6 | 153.6 | 429.0 |
| Max device length (μm) (8) | 42.3 | 42.3 | 42.3 | 15.1 | 34.8 | 34.8 | 12.5 |
| DC absorption for Vpp (dB) (9) | 4.60 | 6.90 | 8.28 | 1.65 | 2.96 | 4.44 | 1.06 |
| Single pole S21 response at Nyquist freq (dB) | −1.79 | −1.79 | −1.79 | −0.73 | −1.79 | −1.79 | −0.73 |
| RF ER (dB) (10) | 2.81 | 5.11 | 6.49 | 0.92 | 1.17 | 2.65 | 0.33 |
| Structure | | | | | | | |
| SI Substrate | ✓ | ✓ | ✓ | x | ✓ | ✓ | x |
| Additional MQW | x | ✓ | ✓ | x | x | ✓ | x |
| Improved well/barrier ratio | ✓ | ✓ | ✓ | x | x | x | x |
| Improved ridge geometry for reduced C | ✓ | ✓ | ✓ | x | x | x | x |

| Legend: | Good ER | Marginal ER | Poor ER |
|---|---|---|---|
| Min acceptable ER (dB) | 3.5 | | |
| Typical needed ER (dB) | 5 | | |

Footnotes to Table 1, Table 2 and Table 3 are provided in in Table 4 below.

(1) Pads on SI substrate extracted from measurement; pads on n+ substrate estimated from public domain datasheets.
(2) ER at the given Vpp measured on simplest geometry devices, using half barriers and half wells, and estimated for other devices.
(3) Simplest case: assume well and barrier have equal apportionment of optical field; to first order, this means barrier and wells have same thickness, but not precisely.
(4) Measurements for this work extracted from data; measurements for other sources tend to be higher (worse), but keeping the number the same for apples-to-apples benefit-of-the-doubt comparison.
(5) Total C is split between the pad and the intrinsic EAM; this is the difference between the max C_total from Nyquist limit and the pad capacitance.
(6) The intrinsic device would need this Nyquist limit.
(7) Assumes constant R_eff; in reality, the shortest devices will have more contact resistance, reducing the max C_EAM intrinsic possible for the shortest devices. This may not be precisely taken into account and it means the shortest devices may be penalized further than indicated in this analysis.
(8) For the given C (fF/μm) and the max intrinsic C possible, the max device length for this C is shown.
(9) The EAM follows Beer's Law absorption; the ER value is the ratio in dB between the device length and 100 μm, compared against the above-derived value for 100 μm as reference.
(10) The roll off of the ER curve may be more sophisticated than the roll off of the S21 single pole curve alone, but this is a good estimate to see the differences; the colors in the legend refer to the typical specs for datacenters Some or all of the parameters or variables presented in the tables of herein are referred to herein as parameters or degrees of freedom that can be varied, changed and balanced in combinations of one or more of the degrees of freedom to optimize the design parameters of the device. This makes for a high-speed device capable of operating at the required modulations for today's needs and tomorrow's needs. It is noted that the variables in one example may be combined with variable in another example if the variation provides an improved functionality of the resultant device. The examples are shown in relation to a modulation application and it will be appreciated that different applications may be included in the scope of the present application and claims.

As illustrated in the Table 1 example, for the presently deployed generation of EAM for 56 GB, 112 Gb/s PAM4 modulation applications, a commercially available EAM fabricated on an N+ substrate, with 8 MQWs provides a dynamic extinction ratio of >15 dB. For this work, EAMs are fabricated on a SI InP substrate, with an MQW i-region comprising N wells and N–1 barriers, and a 1:1 thickness ratio of wells and barriers. The dynamic extinction ratio ER exceeds what is typically required. Increasing N from 8 to 13 significantly increases the ER. Differential pads for a differential EAM driver are more easily implemented on a SI substrate.

Figure 8:
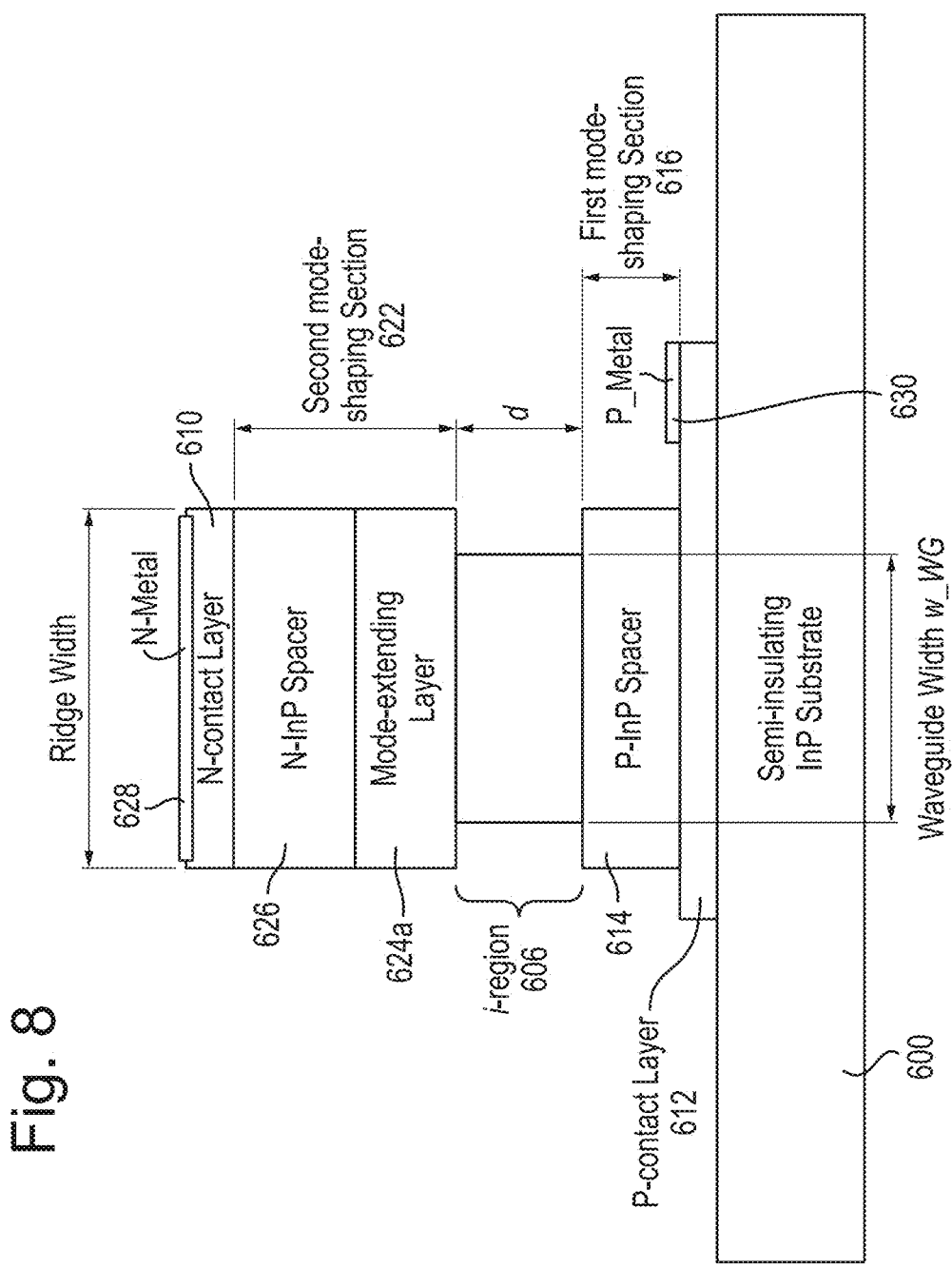
FIG. 8 is a simplified schematic cross-sectional view of a waveguide device such as an EAM of an embodiment wherein the n-region is up and the mode-extending layer is above i-region, in an aspect of the invention.

As illustrated in the Table 2 example for next generation 112 GB, 224 Gb/s PAM4 modulation applications, for which deployment is now starting (as of the time of filing), incumbent approaches using an n+ substrate are marginal (dynamic ER <5 dB). The use of a SI substrate alone significantly increases the dynamic ER. Increasing the number of MQWs from 8 to 13 assists with increasing dynamic ER without increasing capacitance or sacrificing speed. An example eye diagram for 224 Gb/s PAM4, 112 GB is shown in FIG. 8. As many as 24 MQWs may be used in some examples, assuming the increase in thickness (i.e. vertical thickness) of the i-region is not too big leading to negative impact on the operational speed.

As illustrated in the Table 3 example for 224 GB, 448 Gb/s PAM4 modulation applications, data to the right of the table, incumbent approaches are marginal. The SI substrate helps, but does not fully solve the dynamic ER issue. Increasing N from 8 to 13 increases the dynamic ER from 1.17 dB to 2.65 dB, but this is still below a minimum acceptable value of 3.5 dB. Additional tools may be needed to increase the dynamic ER. The EAM waveguide geometry and dimensions may be adjusted, as illustrated schematically in FIG. 5 to reduce the capacitance per unit length, e.g. to ≤0.7 fF/μm. Additionally, or alternatively, the relative thicknesses of the wells and barriers of the MQW structure can be skewed in favor of well thickness. For example, instead of wells and barriers having the same thickness, e.g. 1:1 ratio in the range of about 9 nm to about 11 nm, the thickness of the barriers relative to the wells can be reduced to <1:1, e.g. about 6 nm barriers and about 10 nm wells to provide a 6:10 ratio.

As illustrated by the data in the left of the table, the combined effect of reducing the width of the MQW i-region, reducing the length of the i-region, increasing N to 13 or 16, and adjusting the thickness ratio of the barriers and wells of the MQW i-region, increases the dynamic ER to >5 dB. These variables may be balanced in a number of different ways including some or all of the variables and sometimes including further variables as mentioned elsewhere. The total thickness of the i-region can be increased up to a limit that is linked to a transit time limit. For example, to provide an EAM for which the bandwidth is RC limited, and not transit time limited, the thickness of the i-region is kept below e.g. 0.4 μm. In example embodiments, the i-region has a thickness (d) of 330 nm or 220 nm.

FIG. 7 to FIG. 10 each show alternatives to the previous example embodiments and it will be appreciated that there may be still more variations that are not shown in a specific figure. Like references refer to similar structures but these may comprise different materials than shown in the figures. This is particularly the case where the devices shown are n-up or p-up as the case may be. In FIGS. 7 to 10, the darker grey indicates for example a higher refractive index layers of the i-region, a lighter grey for example a lower refractive index InP spacer layer, and intermediate grey for example, the mode-extending layers which may have an intermediate refractive index. This is by way of example and to aid understanding but is not intended to be limiting to the nature of the refractive indexes in these figures or any others having similar coloring or shading.

Figure 7:
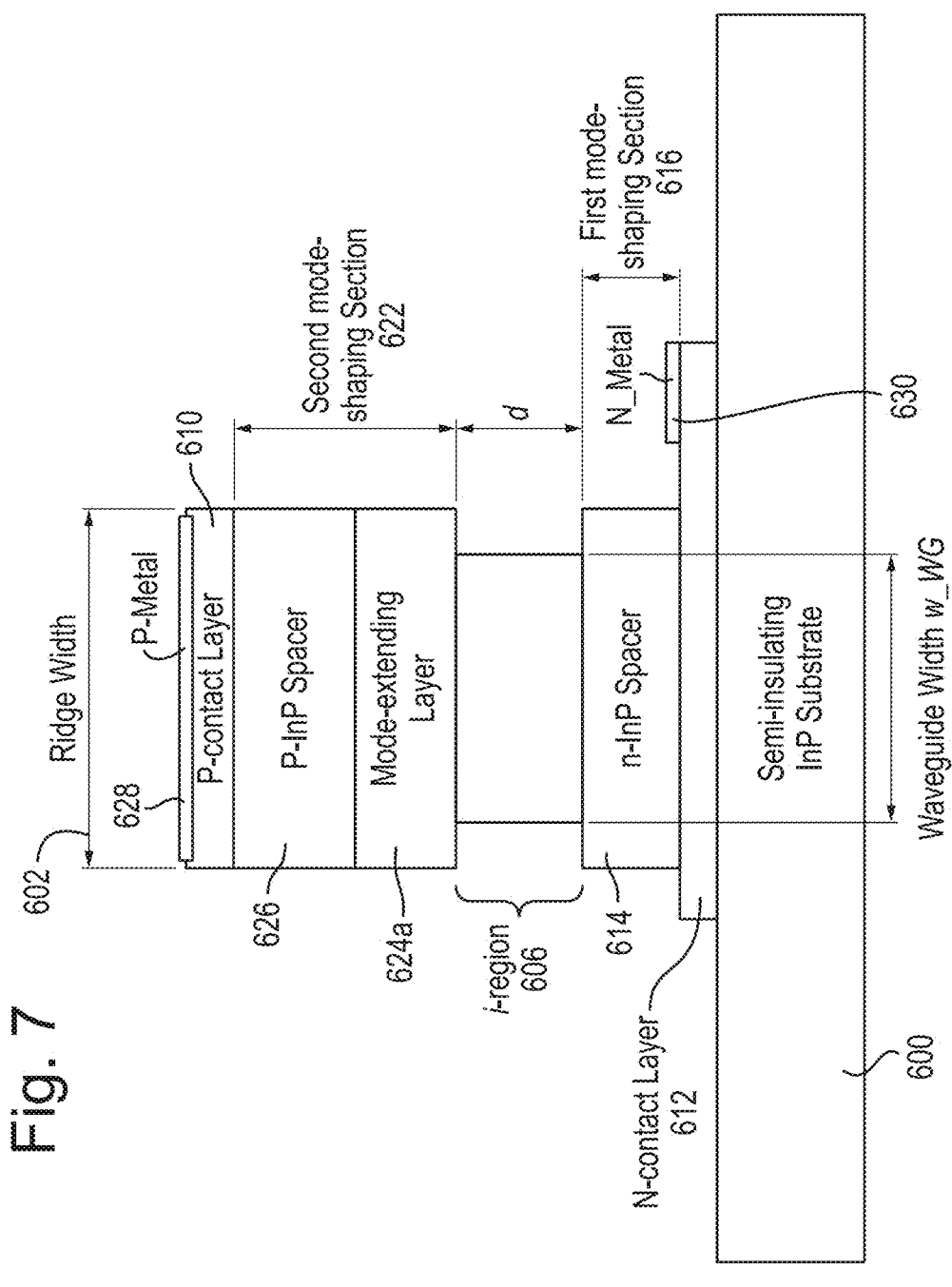
FIG. 7 is a simplified schematic cross-sectional view of a waveguide device such as an EAM of an embodiment wherein the p region is up and the mode-extending layer is above i-region, in an aspect of the invention.

FIG. 7 shows a simplified schematic cross-sectional view of a waveguide device such as an EAM of an embodiment wherein the p-cladding and p-contact is on top and the n-cladding and n-contact is underneath the i-region, as described for the embodiment shown in FIG. 5. The substrate comprises semi-insulating (SI) InP, e.g. SI Fe doped InP. The waveguide structure comprises an epitaxial layer stack wherein the i-region comprising absorption material which is sandwiched between a p-contact layer and p-cladding and an n-cladding and n-contact layer. For example, the n-layers comprise a n-contact layer of N-InGaAs and an n-InP spacer layer, which acts as a lower mode-shaping section. The i-region comprises an absorption region comprising absorption material. An upper mode-shaping section that comprises a p-type mode-extending layer, a p-InP spacer layer and a p-contact layer comprising $p^{++}$-InGaAs. A P-metal contact is provided on top of the ridge on the p-contact layer. An N-metal contact is provided on the N-InGaAs layer at the bottom. The device structure is encapsulated with layer of dielectric.

FIG. 8 shows a schematic cross-sectional view of a waveguide device such as the EAM of an embodiment wherein the n-cladding and n-contact is on top and the p-cladding and p-contact is underneath the i-region. The substrate comprises semi-insulating (SI) InP, e.g. SI Fe doped InP. The waveguide structure comprises an epitaxial layer stack wherein the i-region comprising absorption material which is sandwiched between an n-contact layer and n-cladding and an p-cladding and p-contact layer. For example, the p-layers comprise a p-contact layer of p-InGaAs and an p-InP spacer layer, which acts as a lower mode-shaping section. The i-region comprises an absorption region comprising absorption material. An upper mode-shaping section that comprises an n-type mode-extending layer, an n-InP spacer layer and an n-contact layer e.g. comprising n-InGaAs is provided. An n-metal contact is provided on top of the waveguide on the n-contact layer. A p-metal contact is provided on the p-InGaAs layer at the bottom. The device structure may be encapsulated with layer of dielectric.

As described above, the absorption region of the i-region may comprise InGaAs, a quaternary absorption material selected within the InP-based materials system, or a QCSE Multi-Quantum Well (MQW) structure. The absorption material may be lattice matched to InP, in examples. The i-region may include upper and lower SCH layers. In this embodiment, the width of absorption region of the waveguide w_WG, is narrower than the waveguide width of for example the ridge, to reduce the device area of the i-region and therefore reduce the intrinsic device capacitance per unit length. For example, the mode-extending layer may comprise a quaternary material having a refractive index which is greater than the refractive index of the InP spacer layers, and less than the refractive index of the absorption material of the i-region. The upper and lower mode-shaping regions provide for more efficient optical coupling with a larger optical spot size. A semi-insulating substrate reduces parasitics for the waveguide device itself, and for the contact pads. The SI substrate also allows for independent control of the n-contact and p-contact for operation with electronic circuitry as required for control and driving the EAM. Optionally, electronics layers may be provided between the SI substrate and the photonics layers of the waveguide device, e.g. as described with reference to FIG. 14.

Figure 9:
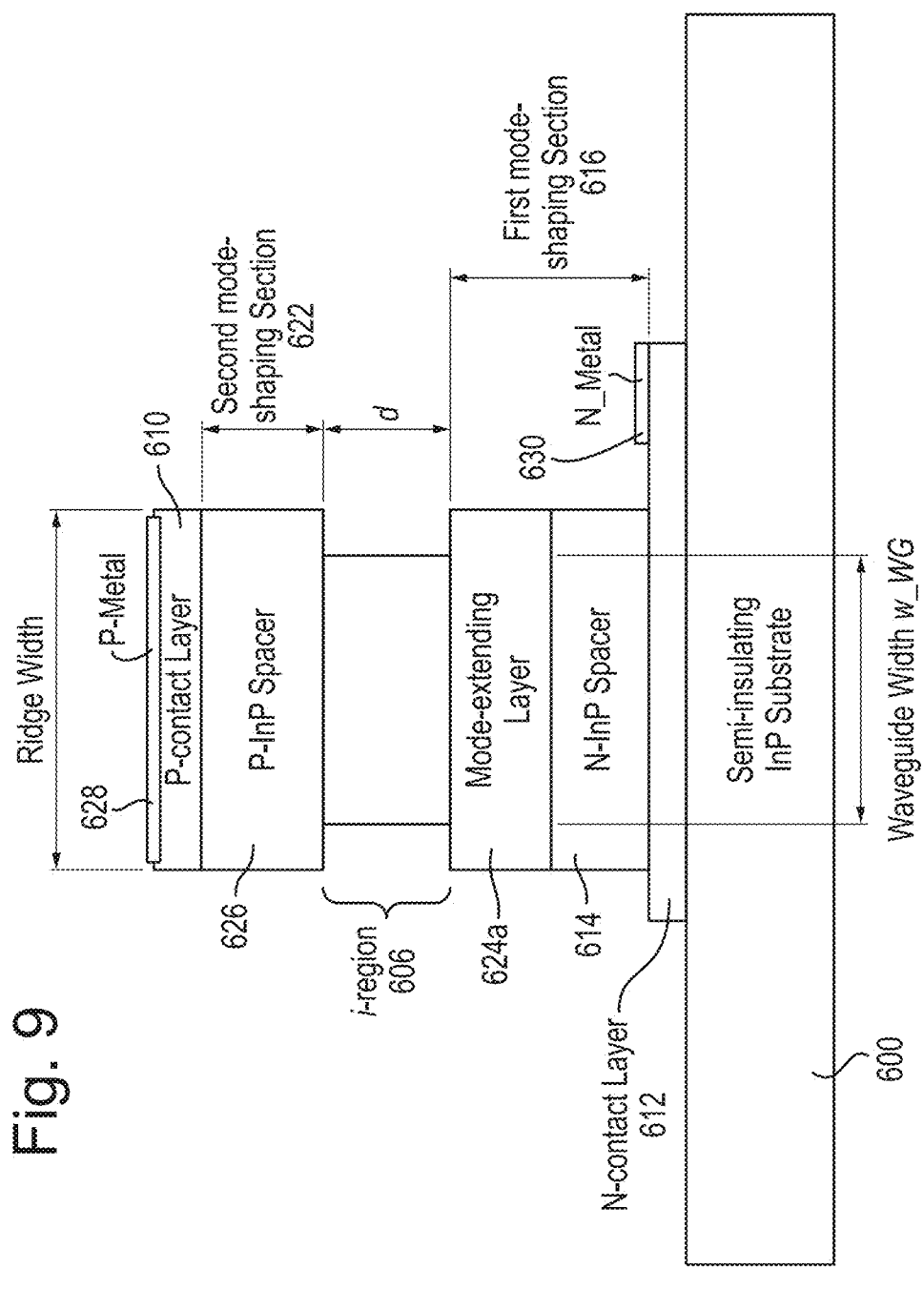
FIG. 9 is a simplified schematic cross-sectional view of a waveguide device such as an EAM of an embodiment wherein the p-region is up and the mode-extending layer is below i-region, in an aspect of the invention.

FIG. 9 is similar to FIG. 7 with the mode-extending layer provided underneath the i-region and omitted above.

Figure 10:
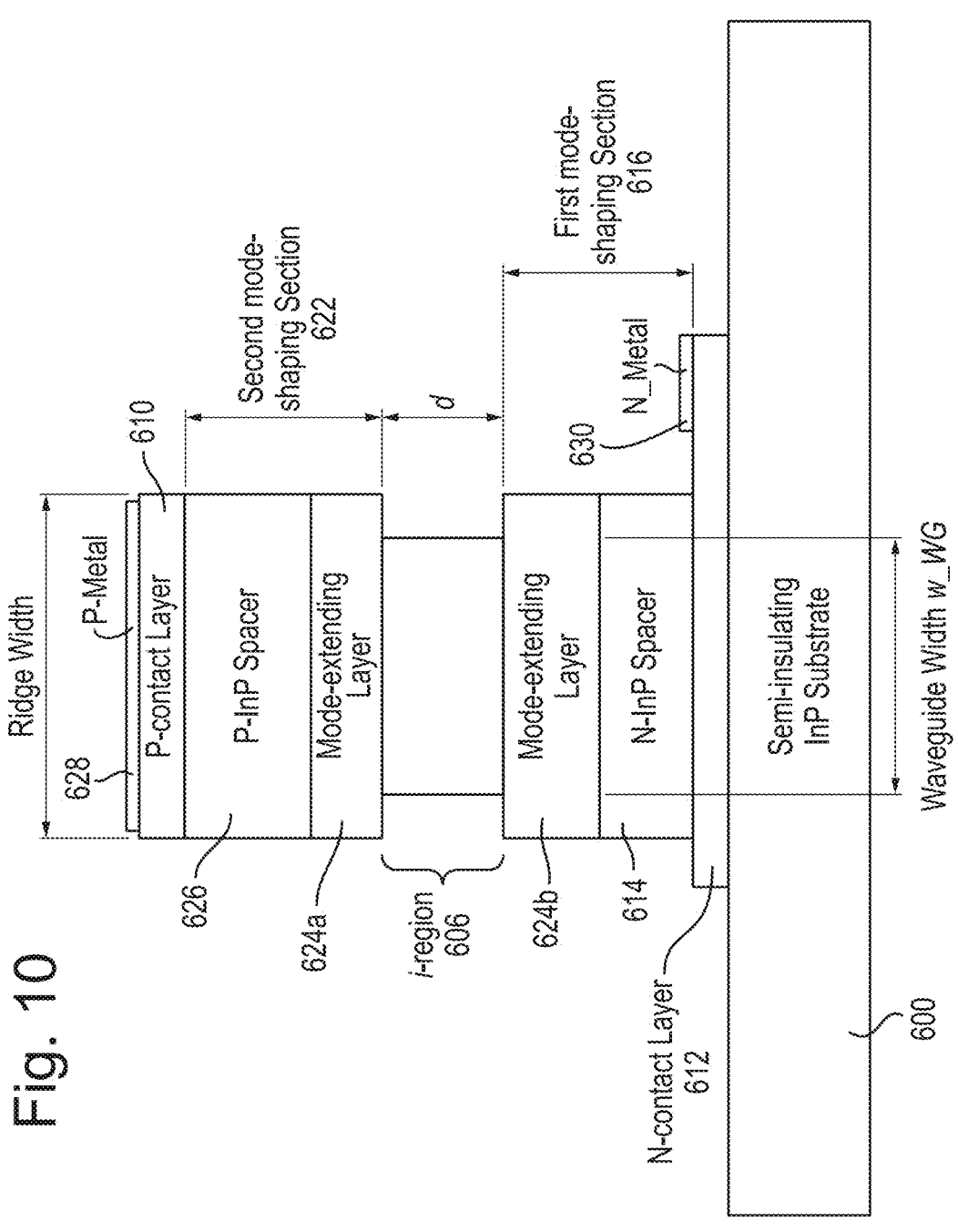
FIG. 10 is a simplified schematic cross-sectional view of a waveguide device such as an EAM of an embodiment wherein the p-region is up and the mode-extending layer is both above and below i-region, in an aspect of the invention.

FIG. 10 shows a schematic cross-sectional view of a waveguide device or EAM of an embodiment wherein a mode-extending layer is provided above and below the i-region. For example, each mode-extending layer may be a quaternary material having a refractive index intermediate the adjacent InP spacer layer and the i-region. In this example, the p-cladding layers are on top and the n-cladding layers are below the i-region. Alternatively, the n-cladding layers are on top, and the p-cladding layers are below the i-region. The cladding layers are also referred to as p-layers and n-layers in the claims and other places in the application. Elements of the waveguide structure shown in FIG. 10 are similar to those described for FIG. 7, with the addition of a mode-extending layer underneath the i-region, as well as a mode-extending layer above the i-region. Optionally, electronics layers may be provided between the SI substrate and the photonics layers of the waveguide, e.g. as described with reference to FIG. 14.

In FIG. 10 different thicknesses of upper and lower mode-extending sections are used to illustrate schematically that the structure need not be vertically symmetric above and below the i-region and each layer could be independently optimized. In some examples as one of the degrees of freedom or parameters mentioned above. In another embodiment the first and second (upper and lower) mode-extension layers may have vertical symmetry of the waveguide relative to centre of i-region. For example, a circularly symmetric first order optical input mode from a single mode fibre is centred on the i-region. Other optimized coupling of multiple modes of different shapes, i.e. more complex multimode coupling of different mode shapes in which each layer thickness may be separately optimized is also envisaged. Accordingly, FIG. 10 is just one example of a mode-extending layer being provided above and below the i-region. Similarly, there may be different layers proximate the mode-extending layers as long as their function serves to provide a manner in which an extension of a mode or modes can be captured by the mode-extending layer.

In waveguide structures described above, a thick layer of InP is used to separate the mode from the InGaAs of the HBT, to reduce undesired absorption. A mode-extending layer may be provided above the i-region as described above, and/or below the i-region. The mode-extending layer may have a refractive index greater than the refractive index of the InP spacer layers, and less than the refractive index of the i-region. The mode-extending layer is used to shape the mode so as to extend the mode either above or below the i-region for improved optical coupling, but judiciously so as to prevent unwanted absorption in the InGaAs and metal layers above, or the InGaAs layer below.

As previously indicated the figures show non-limiting examples of combinations of layers and materials and many of these could be changeable depending on the design requirements of the device and the purpose thereof. In the waveguide device of example embodiments illustrated in the Figures, the p-contact and p-layers are on top, and the n-contact and n-layers are at the bottom of the waveguide structure. In alternative embodiments, the waveguide structure may be fabricated with the p-contact and p-layers at the bottom and the n-contact and n-layers at the top.

TABLE 5

| shows some example data for waveguides of different lengths. | | |
|---|---|---|
| Device length (µm) | Device capacitance (fF) | Series resistance (Ω) |
| 80 | 67 | 15 |
| 100 | 80 | 12 |
| 120 | 93 | 10 |

Reducing the lateral dimensions of the EAM waveguide presents a challenge for optical coupling. To reduce insertion losses, the EAM waveguide structure comprises upper and lower mode-shaping sections, as illustrated schematically for the embodiment shown in FIG. 5, to facilitate optical coupling to and from the EAM. One or both of the upper and lower mode-shaping sections may comprise a mode-extending layer which may be a quaternary mode-extending layer. A thick InP layer separates the mode to separate the mode from the overlying and underlying InGaAs layers to reduce undesired absorption. The mode-extending layer is used to shape the mode so as to extend the mode either above or below the i-region for coupling, but judiciously so as to prevent unwanted absorption in the layers above or below, such as the InGaAs and metal above, or the InGaAs below in an illustrated example.

Figure 11A:
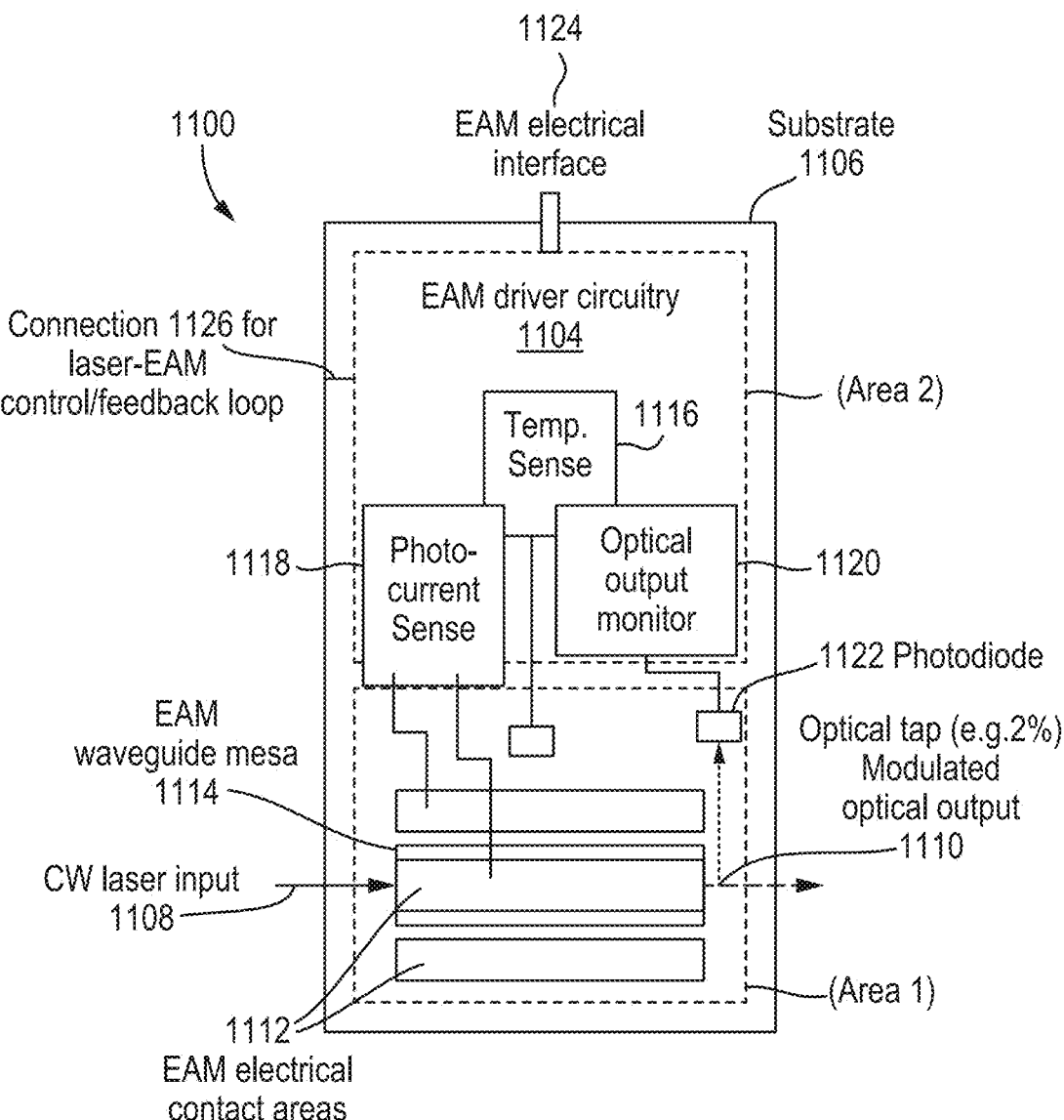
FIG. 11A is a schematic plan view of a monolithic electro-photonic integrated circuit comprising an EAM with integrated EAM driver circuitry, according to an aspect of the invention.
Figures 11B, 11C:
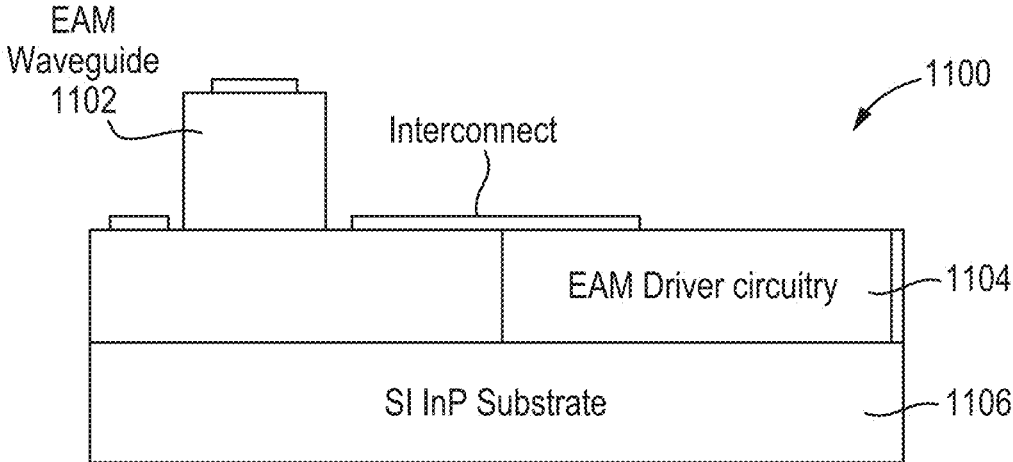
FIG. 11B is a simplified cross-sectional view of an epitaxial layer structure for fabrication of a monolithic electro-photonic integrated circuit comprising an EAM with integrated EAM driver circuitry, according to an aspect of the invention.
FIG. 11C is a simplified cross-sectional view of a monolithic electro-photonic integrated circuit comprising an EAM with integrated EAM driver circuitry, according to an aspect of the invention.

U.S. Pat. Nos. 10,673,532 and 10,530,484 disclose device structures for monolithic integration of an EAM and EAM driver circuitry. For example, FIGS. 11A, 11B, and 11C herein are adapted from FIGS. 3A, 3B and 3C of these patents but apply to the new devices of the present invention at a high level. FIG. 11A shows a schematic plan view of a monolithic electro-photonic integrated circuit 1100 comprising an EAM waveguide 1102 (in Area 1) with integrated EAM driver circuitry 1104 (in Area 2) of a substrate 1106. As shown a continuous wave laser input 1108 is modulated by the EAM to produce a modulated optical output 1110. The EAM further comprises a contacts 1112 and an EAM waveguide mesa 1114. The EAM driver circuit may include multiple capabilities for example a temperature sensor 1116, a photo-current sensor 1118 and an optical output monitor 1120 including a photo-diode 1122 for monitoring the output 1110. The device may further include other features and components, such as an electrical interface 1124 and a connection for other features 1126 such as a control feedback loop and the like. FIG. 11B shows a simplified cross-sectional view of an epitaxial layer structure 1130 for fabrication of the monolithic electro-photonic integrated circuit 1100 comprising the EAM 1102 with integrated EAM driver circuitry 1104. The epi-layers as formed comprise a SI InP Substrate 1106 on which is grown an InP HBT Epi-layer or layers 1132 and atop an EAM Waveguide Epi-layer or layers 1134.

FIG. 11C shows a simplified cross-sectional view of the monolithic electro-photonic integrated circuit 1100 comprising the EAM 1102 with integrated EAM driver circuitry 1104. The device 1100 further includes contacts 1136 and an interconnection 1138. The locations and relative sizes being by way of example. The EAM waveguide shown in this figure can comprise any example shown or not shown herein. In the latter case the variations of parameters or degrees of freedom used to design the waveguide device is intended to cover all examples falling within the scope of the claims. The device may further comprise isolation and electrical connections as required to isolate and connect the EAM and the driver as needed for operation of the device in use.

FIG. 12 shows a simplified view of an epitaxial layer structure 1202 for fabrication of a monolithic electro-photonic circuit 1200 comprising an EAM waveguide and driver electronics comprising InP HBTs, as an example. The epitaxial layer structure is fabricated with III-V semiconductor materials, e.g. group III-V semiconductor materials, such as an Indium Phosphide (InP)-based material system comprising binary, ternary, quaternary and other compositions of In, Ga, As, P, Al and Sb. The epilayer structure is formed on a Semi-Insulating (SI) InP substrate 1204 and comprises a first plurality of semiconductor layers 1206 for electronics comprising in examples, InP HBTs (electronics layers) and a second plurality of semiconductor layers 1208 (photonics layers) for the EAM waveguide. The electronics layers are separated from the photonics layers by an isolation layer 1210 comprising one or more layers, e.g. one or more mode-separating layers and/or layers for electrical isolation.

FIG. 13 shows a schematic cross-sectional view of a monolithic electro-photonic integrated circuit 1200 grown on the SI InP substrate 1202 comprising an EAM 1212 and EAM driver electronics 1214 of an example device topology. The EAM waveguide structure is fabricated on a first area of the substrate (EAM area) and the EAM driver electronics are fabricated on a second area of the substrate (Driver Electronics Area). The photonics layers 1208 and isolation 1210 are removed from the Driver Electronics Area. Lateral electrical isolation 1216 is provided between the electronics layers 1206 (first plurality of semiconductor layers) underlying the EAM waveguide structure 1208 and the electronics layers comprising HBTs of the EAM driver electronics. One or more metallization layers and dielectric layers (omitted from FIG. 13) are provided to form contact areas of the HBTs, and to define other electrical components, such as resistors, capacitors, and inductors; and to provide contact areas of the EAM, and electrical interconnections between the EAM driver circuit and the EAM.

Figure 14:
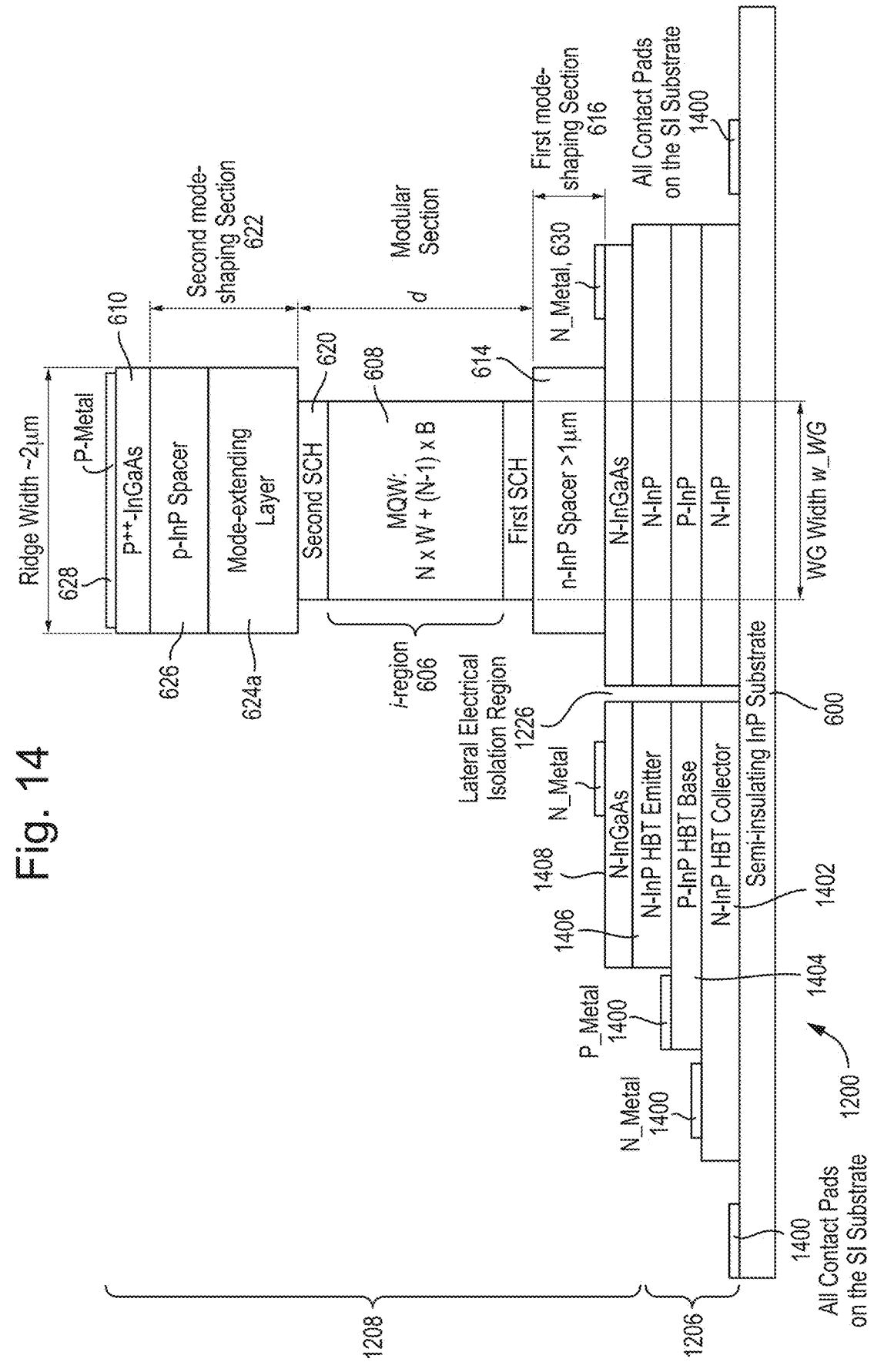
FIG. 14 is a schematic cross-sectional view of a monolithic electro-photonic integrated circuit comprising an EAM and EAM driver electronics, according to an aspect of the invention.

FIG. 14 shows a schematic cross-sectional view of a monolithic electro-photonic integrated circuit 1200 comprising an EAM illustrated by photonic layers 1208 and EAM driver electronics illustrated by electronic layers 1206. FIG. 14 is a schematic cross-sectional view of an example epilayer structure, e.g. as illustrated schematically in FIG. 12 and FIG. 13, to illustrate more details of the epi-layer structure fabricated with III-V semiconductor materials, e.g. group III-V semiconductor materials, such as an Indium Phosphide (InP)-based material system comprising binary, ternary, quaternary and other compositions of In, Ga, As, P, Al and Sb. The electronics layers 1206 are formed on SI InP-substrate 600 and comprise a layer of N-InP 1402, a layer of P InP 1404 and a layer of N-InP 1406. These form respectively a collector, base and emitter of a transistor. In the electronics area for the driver, the electronics layers 1206 are structured to form one or more HBTs of the electronic circuitry, with one HBT being shown by way of example. In the photonics area, the photonics layers 1208 are structured to form an EAM waveguide, having a structure as illustrated schematically in for example FIG. 5 or any other examples herein (whether illustrated or not) including for example FIGS. 7 to 10 and in accordance with one or more degrees of freedom or parameters of the design. The electronics layers 1206 underlying or horizontally displaced from the EAM waveguide 1208 are laterally electrically isolated from the HBTs, e.g. by an isolation trench 1226. After processing the photonics layers and the electronics layers, one or more on-chip metallization layers are provided to form device contact areas, and to provide electrical interconnections between the EAM and the EAM driver circuit, and to provide external contact pads. Example of contacts shown in FIG. 14 include contacts 1400, contacts 628 and 630. The electronics components may comprise resistors, capacitors or inductors fabricated with the on-chip metallization layers and intervening dielectric layers.

In EAM waveguide structure described above a thick layer of InP is used to separate the mode from the InGaAs of the HBT, to reduce undesired absorption. A mode-extending layer may be provided above the i-region as described above, and/or below the i-region. The mode-extending layer is used to shape the mode so as to extend the mode either above or below the i-region for coupling, but judiciously so as to prevent unwanted absorption in the InGaAs and metal layers above, or the InGaAs below. The mode-extending layer may comprise a quaternary mode-extending layer.

Figure 15:
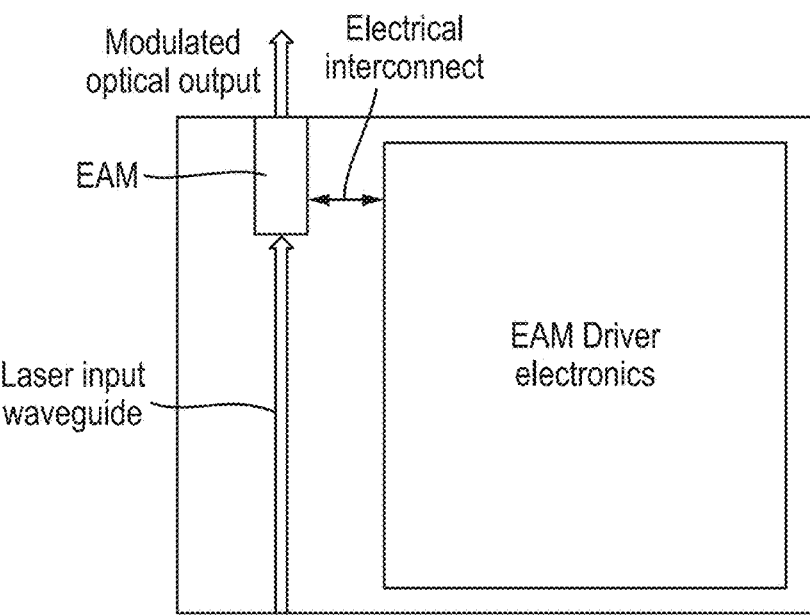
FIG. 15 is a simplified schematic plan view of a monolithic electro-photonic integrated circuit comprising an EAM waveguide and EAM driver electronics to illustrate an example device topology, according to an aspect of the invention.

FIG. 15 is a simplified schematic plan view of a monolithic electro-photonic integrated circuit comprising an EAM waveguide and EAM driver electronics to illustrate an example device topology. In practice, the dimensions of the EAM waveguide and the EAM contact areas occupy a relatively small area of the chip relative to the device areas required for the EAM driver electronics and external contact pads. The photonics and electronics components are positioned in close proximity, for improved electrical performance. For example, if the interconnect distance between the photonics and electronic components is ≤20 μm, interconnect parasitics (interconnect capacitances/inductances/resistances) are reduced, and transmission line effects become negligibly small.

Figure 16:
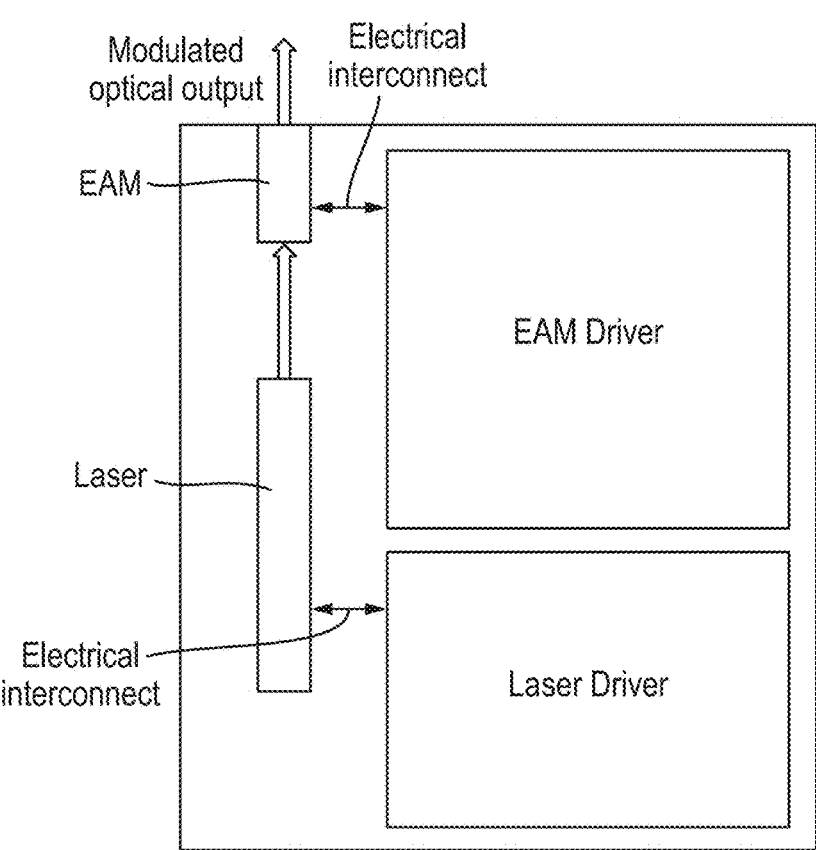
FIG. 16 is a simplified schematic plan view of a monolithic electro-photonic integrated circuit comprising an on-chip laser and laser driver, an EAM waveguide and an EAM driver electronics to illustrate an example device topology, according to an aspect of the invention.

FIG. 16 is a simplified schematic plan view of a monolithic electro-photonic integrated circuit comprising an on-chip laser, laser driver electronics, an EAM and EAM driver electronics to illustrate an example device topology.

Figure 17:
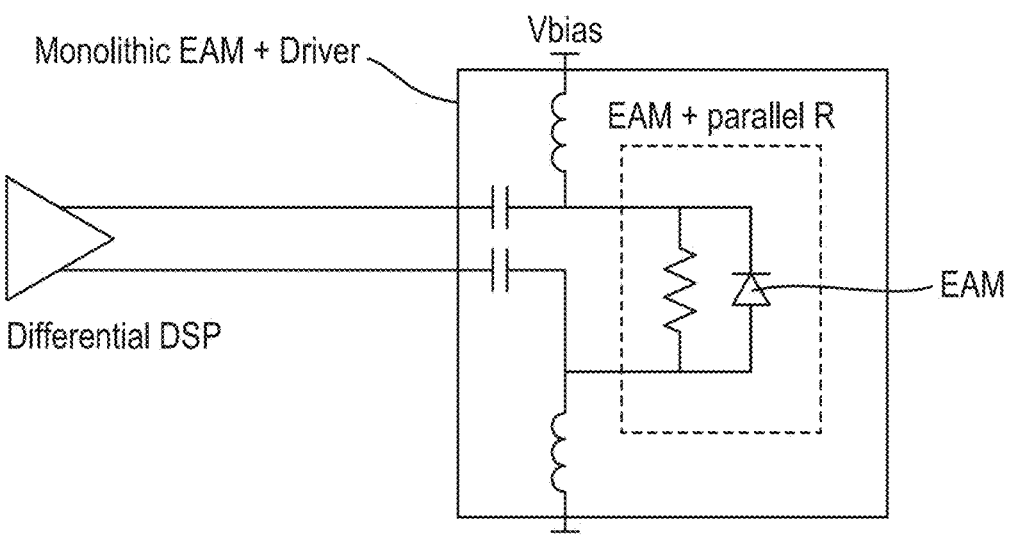
FIG. 17 is a circuit schematic of an EAM and a differential EAM driver circuit which is monolithically integrated on a single die, according to an aspect of the invention.
Figure 18:
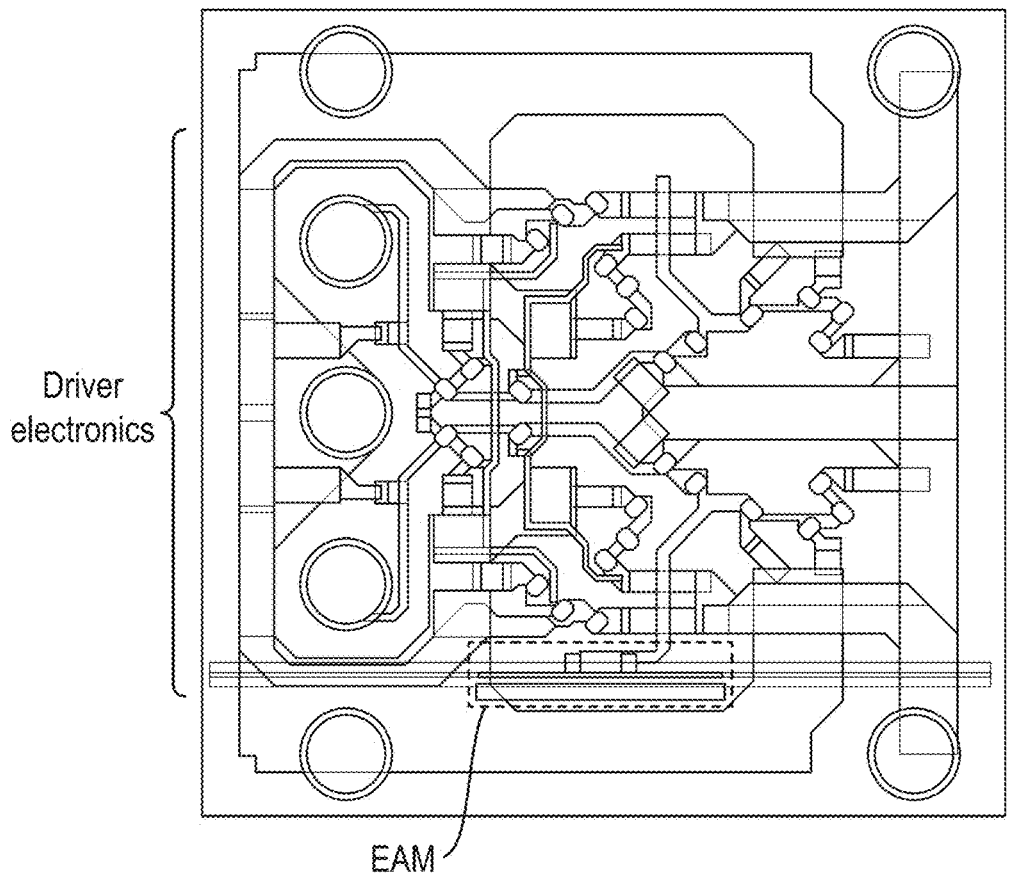
FIG. 18 is an example circuit layout for an EAM and a differential EAM driver circuit which is monolithically integrated on a single die, according to an aspect of the invention.

FIG. 17 is a circuit schematic of an EAM and a differential EAM driver circuit of an example embodiment which is monolithically integrated on a single die. A differential DSP is connected to differential inputs of the EAM driver circuit. The EAM driver is a conventional differential driver with a bias T. In this example, the capacitors and bias inductors are monolithically integrated on the chip. The EAM has a parallel resistor. FIG. 18 is an example circuit layout for an EAM and a differential EAM driver circuit, which is monolithically integrated on a single die. The EAM is identified by the dashed outline.

Figure 19:
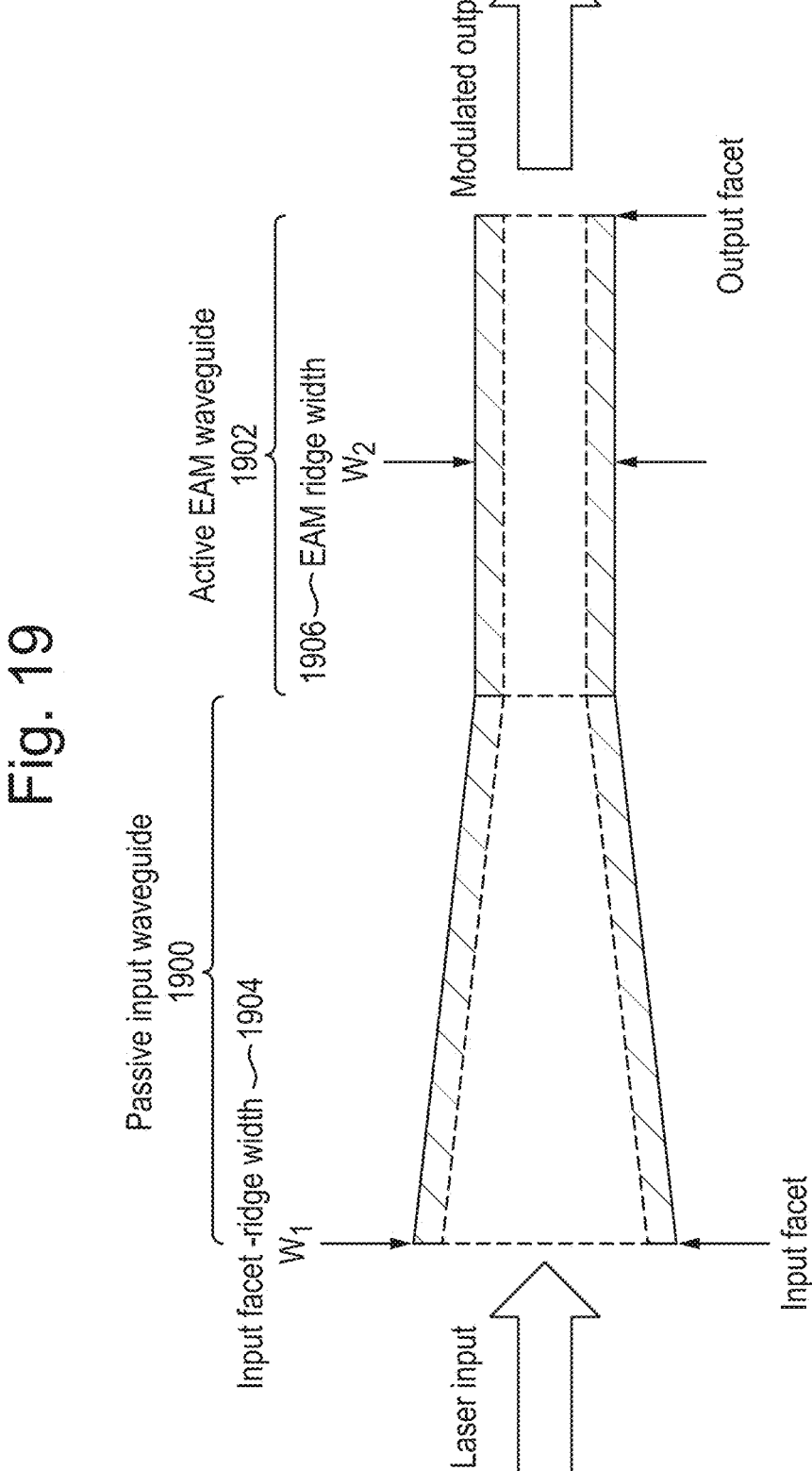
FIG. 19 is a schematic top view of an optical waveguide of a first example embodiment comprising a passive input waveguide and an active EAM waveguide.

FIG. 19 adds in an example mode extending layer with stronger refractive index relative to InP, to extend optical mode upwards and reduce optical loss/facilitate optical coupling into EAM. The shape and size of the waveguides act as a spot size convertor (SSC) and are sized as stated elsewhere. FIG. 19 is a schematic top view of an optical waveguide of an example embodiment comprising a passive input waveguide 1900 and an active EAM waveguide 1902. The EAM waveguide 1902 has a ridge width 1906 of $W_2$. The passive input waveguide 1900 is tapered from a wider input facet having a ridge width 1904 of $W_1$, to a width of $W_2$ which matches the ridge width $W_2$ of the active EAM waveguide 1902. FIG. 20 is a schematic cross-sectional view of the input facet of the passive waveguide 1900 shown in FIG. 19, having a ridge width 1904 $W_1$. FIG. 21 is a schematic cross-sectional view of the active EAM waveguide 1902 shown in FIG. 19, having a ridge width 1906 $W_2$. The MQW layers 608 of the i-region are undercut, e.g. by 0.3 μm along each side of the ridge. The active EAM waveguide 1902 includes an n-contact 2100 beside the ridge of the waveguide and a p-contact 2102 on top of the ridge. In examples the waveguides may both be active.

Figure 22:
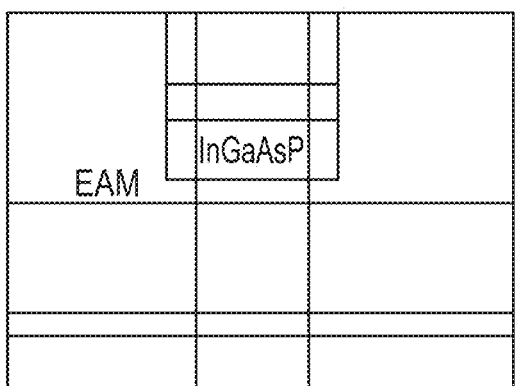
FIG. 22 is a schematic cross-sectional view of the input facet of an example passive input waveguide for optical modelling of the waveguide structure shown in FIGS. 19-21.
Figure 23:
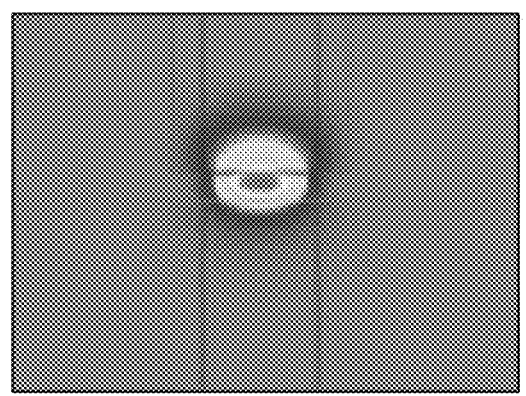
FIG. 23 shows a cross-sectional view through the simulated optical mode within the waveguide structure shown in FIG. 22.

FIG. 22 is a schematic cross-sectional view of the input facet of an example passive input waveguide 1900 for optical modelling of the waveguide structure shown in FIGS. 19-21. The mode extending layer comprises, for example, 800 nm of InGaAsP, which has a higher refractive index relative to InP, to extend the optical mode upwards to facilitate optical coupling into the EAM and reduce optical losses. FIG. 23 shows a cross-sectional view through the simulated optical mode within the waveguide structure shown in FIG. 22.

Figure 24:
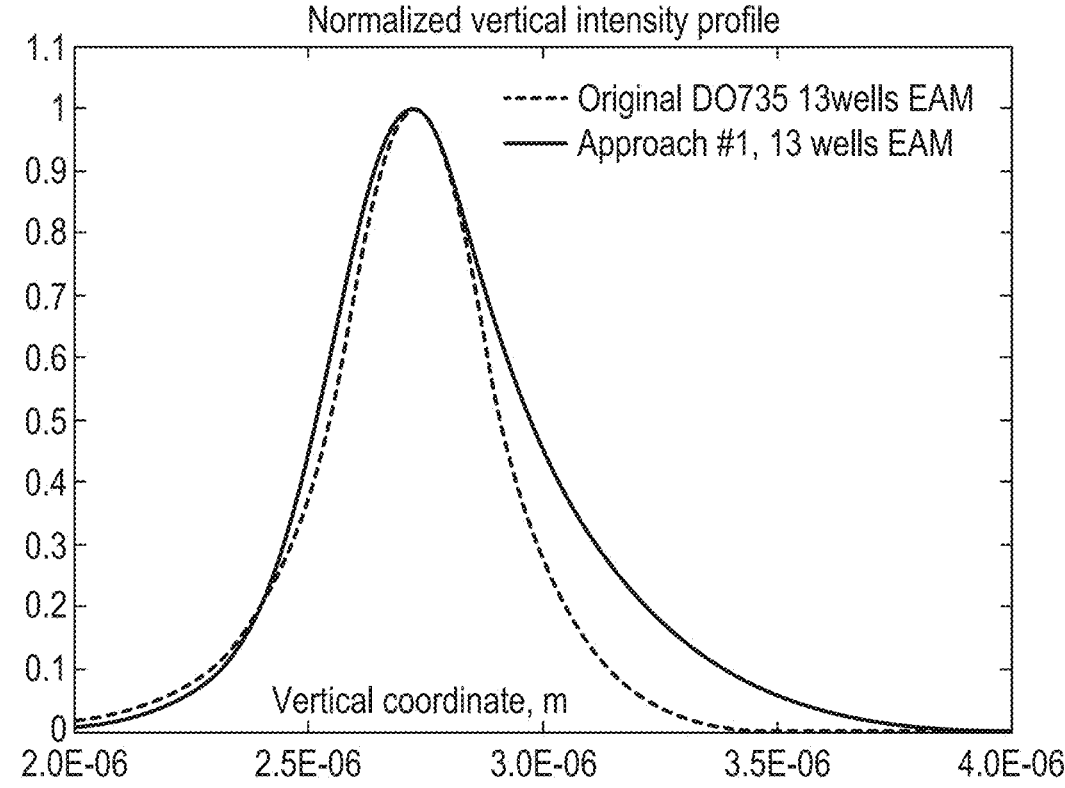
FIG. 24 shows a normalized vertical intensity profile for a waveguide as shown in FIG. 22 with a quaternary mode extending layer, and a similar waveguide without the quaternary mode extending layer.

FIG. 24 shows a normalized vertical intensity profile for a waveguide structure as shown in FIG. 22 with a quaternary mode extending layer, and a waveguide of similar dimensions without the quaternary mode extending layer.

As with other examples, the locations of layers, sizes, types other variables or parameters and materials can vary according to any other example described herein. FIGS. 19 to 24 are used to show tapered passive optical waveguide which tapers from a first width at the optical input to a second width that is narrower than the first width and matches an input width of the active EAM waveguide. This is again useful in confining light in the i-region as described throughout. The i-region is moderately undercut along a length of the tapered passive optical waveguide and the active EAM waveguide, by ≤0.3 µm in an example. Other examples are valid even though not specifically stated.

Reference herein to HBTs is understood to include Single Heterostructure Bipolar Transistors (SHBTs) and Double Heterostructure Bipolar Transistors (DHBTs) and other types of HBTs.

The device structures disclosed herein may be fabricated with III-V semiconductor materials, e.g. group III-V semiconductor materials, such as an Indium Phosphide (InP)-based material system comprising binary, ternary, quaternary and other compositions of In, Ga, As, P, Al and Sb. For example, the SI substrate is Fe-doped InP, and the HBTs and EAM waveguides are fabricated from an InP-based material system, comprising selected binary, ternary and quaternary and other compositions of In, Ga, As, P, Al, and Sb. In some embodiments, the epilayer structure is compatible with a single epitaxial growth process. In other embodiments, a multiple growth process is used.

For example, the MQW layers can be fabricated using MOCVD, MBE or other growth techniques. The strength of the excitonic binding energy for QCSE can be affected by the choice and specific implementation parameters of the growth technique. Control of the dopant for the n-layers and the p-layers provides for adjusting the capacitance. Typical MOCVD growths use Zn as the p-type dopant. MBE can provide Beryllium (Be) as the p-type dopant, which is an advantage because Be is less mobile than Zn. This allows the junction with the i-region to be more abrupt, so that the p-i-n structure is defined to be more manufacturable in accordance with one or more degrees of freedom or parameters of the design.

To provide accurate control and fidelity of E-field, it is preferable to use MBE over MOCVD for fabrication, to provide more abrupt junctions. Use of a low physical mobility p-type dopant, e.g. Be rather than Zn, or C if possible, provides for a one-sided abrupt junction, and low-unintentionally doped intrinsic region. Diffusion of the n-type dopant, e.g. Si, is not usually an issue. Well defined junctions allow for a near-constant E-field across the intrinsic region, very little voltage drop outside the intrinsic region, and very little optical coupling outside the intrinsic region. Optical coupling outside the intrinsic region would lead to loss or, worse, diffusion tails.

For coupling to outside world, the effective spot size of the edge-receiving optical facet can be increased by optimizing the waveguide structure: e.g. the epilayer structure; processing and lateral ridge dimension, to enable optical coupling to a spot size of ~2 µm, without resorting to a spot-size converter. Addition of a spot size converter adds significant length and optical loss. For example, upper and lower mode shaping sections are provided as illustrated schematically in FIG. 5. The thickness of the i-region is increased up to a value related to the transit time limit of the i-region. When the thickness of the i-region is below a limit related to the transit time limit, the bandwidth is RC limited. The upper and lower SCH can be used to fine tune the thickness of the i-region.

Although example embodiments have been described and illustrated in detail, it is to be clearly understood that the same is by way of illustration and example only and not to be taken by way of limitation, the scope of the present invention being limited only by the appended claims.

The invention claimed is:

1. An electro-photonic device comprising
a semi-insulating (SI) indium phosphide (InP) substrate;
an epitaxial layer stack formed on the SI InP substrate comprising a first plurality of semiconductor layers forming an electro-absorption modulator (EAM) driver and an overlying second plurality of semiconductor layers forming an EAM;
the EAM driver comprising one or more InP heterojunction bipolar transistors;
the EAM configured as a PIN waveguide and comprising an n-layer structure, a p-layer structure and an i-region between the n-layer structure and the p-layer structure;
the i-region comprising an optical material defining an operational wavelength range;
the n-layer structure and the p-layer structure configured to optically confine one or more modes of an optical signal to propagate through the i-region; and
at least one of the n-layer structure and the p-layer structure comprising a mode-extending layer.

2. The electro-photonic device of claim 1, wherein the mode-extending layer comprises a quaternary material and the epitaxial layer stack is fabricated with group III-V semiconductor materials, including an Indium Phosphide (InP)-based material system comprising binary, ternary, quaternary and other compositions of In, Ga, As, P, Al and Sb.

3. The electro-photonic device of claim 1, wherein the mode-extending layer comprises one of:
i) an n-type layer in the n-layer structure;
ii) a p-type layer in the p-layer structure; and
iii) a p-type layer in the p-layer structure and an n-type layer in the n-layer structure.

4. The electro-photonic device of claim 1, wherein the i-region comprises an absorption material.

5. The electro-photonic device of claim 4, wherein the i-region comprises InGaAs or a quaternary absorption material selected within an InP-based materials system.

6. The electro-photonic device of claim 4, wherein the absorption material comprises a Quantum Confined Stark Effect (QCSE) multi-quantum well (MQW) structure comprising N wells and N−1 barriers.

7. The electro-photonic device of claim 6, wherein the MQW structure comprises InGaAsAl or InGaAsP.

8. The electro-photonic device of claim 6, wherein N is between ≥8 and ≤24.

9. The electro-photonic device of claim 6, wherein a well thickness, a barrier thickness and N are selected to provide a thickness d of the i-region which is related to a transit time limit $t_{tr}$ of carriers in the i-region, where $t_{tr}=d/v$, and v is a carrier velocity of the carrier.

10. The electro-photonic device of claim 6, wherein a ratio of barrier thickness to well thickness is one of:

i) ≤1:1 ii) 6:10.

11. The electro-photonic device of claim 1, wherein a required performance of the EAM is achieved by balancing one or more parameter comprising:

parameters of equations defined herein;

parameters of a compositions, size, materials or doping of the epitaxial layer stack;

an extinction ratio;

inclusion of one or more separate confinement hetero-structure (SCH) layers;

defining a refractive index of each layer of the epitaxial layer stack selecting processing from MBE, MOCVD, or any other process;

balancing fall-off of voltage and/or electric field profile over a length of the i-region;

balancing a width of the i-region relative to a width of the EAM;

a transit time of a carrier (holes or electrons as the case may be);

a difference between the transit times of holes and electrons;

balancing a thickness d of the i-region and the transit time, grading of one or more layers of the epitaxial layer stack;

inclusion of multi-quantum well MQW material and where used, balancing a number of wells and barriers and a ratio of thicknesses of wells to barriers;

providing an undercut to the i-region for reducing the width of the i-region relative to a width of a ridge of the waveguide, to reduce capacitance;

balancing an absorption length of the i-region with a RC value thereof;

balancing one or more parameter to accommodate absorption of a single mode or multiple modes in the i-region;

balancing a waveguide width, waveguide length and thickness of the i-region to provide a quantum efficiency (QE) of ≥80% over a required operational wavelength range;

balancing a waveguide width, waveguide length and thickness of the i-region to provide a capacitance of ≤0.70 fF/μm of length; and wherein the waveguide is a ridge waveguide having a ridge width and a ridge length, and the i-region has a width which is less than the ridge width.

12. The electro-photonic device of claim 1, wherein a width of the i-region is tapered, having a first width at an optical input and narrowing to a second width at a back facet of the EAM.

13. The electro-photonic device of claim 1, wherein the waveguide is made from waveguide materials and dimensions selected to provide one or more of the following:

a dynamic extinction ratio (ER) of ≥5 dB;

a device capacitance of one of:

i) ≤0.85 fF/μm; and ii) ≤0.70 fF/μm.

14. The electro-photonic device of claim 1, wherein the electro-photonic device is configured as a transmitter.

15. The electro-photonic device of claim 1, wherein the EAM driver is electrically interconnected by conductive traces to contact layers of the EAM.

16. The electro-photonic device of claim 1, comprising a spacer comprising one or more intermediate layers between the EAM driver and the EAM.

17. The electro-photonic device of claim 16, wherein the spacer comprises a semi-insulating layer.

18. The electro-photonic device of claim 1, wherein the EAM driver is formed on a first area of the substrate, and the EAM is provided on an adjacent area, and comprising an isolation region electrically isolating the first plurality of semiconductor layers of the first area from the first plurality of semiconductor layers of the adjacent area.

19. An optical system comprising an electro-photonic device of claim 1.

20. The optical system of claim 19, comprising two or more electro-photonic devices.

21. The optical system of claim 19, comprising one or more electro-photonic device operating as a transmitter and one or more electro-photonic devices operating as a receiver.

22. The electro-photonic device of claim 1, wherein the EAM is a ridge EAM having a ridge width in a range of 2 μm to 3 μm and wherein parameters of the i-region of the EAM are balanced to provide a required performance of the EAM by having at least one of:

i) a length of the i-region <100 μm ii) a width of the i-region is less than the ridge width iii) a thickness of the i-region <0.4 μm.

23. A method of fabricating an electro-photonic device according to claim 1, the method comprising forming a semi-insulating (SI) indium phosphide (InP) substrate;

forming an epitaxial layer stack on the SI InP substrate comprising a first plurality of semiconductor layers forming an electro-absorption modulator (EAM) driver and an overlying second plurality of semiconductor layers forming an EAM;

configuring the EAM driver to comprise one or more InP heterojunction bipolar transistors;

configuring the EAM as a PIN waveguide, the PIN waveguide comprising:

an n-layer structure;

a p-layer structure; and an i-region, between the n-layer structure and the p-layer structure, and comprising an optical material defining an operational wavelength range;

wherein the n-layer structure and the p-layer structure are configured to optically confine one or more modes of an optical signal to propagate through the i-region; and wherein at least one of the n-layer structure and the p-layer structure comprising a mode-extending layer.

24. The method of claim 23, further comprising electrically interconnecting the EAM driver by conductive traces to contact layers of the EAM.

25. The method of claim 23, further comprising forming a spacer comprising one or more intermediate layers between the first plurality of semiconductor layers and the second plurality of semiconductor layers.

26. The method of claim 25, further comprising forming the spacer comprising a semi-insulating layer.

27. The method of claim 23, further comprising forming the EAM driver on a first area of the substrate, and forming the EAM on an adjacent area, and forming an isolation region electrically isolating the first plurality of semiconductor layers of the first area from the first plurality of semiconductor layers of the adjacent area.

28. An optical device comprising:

an electro-absorption modulator (EAM); and an integrated EAM driver circuit;

the EAM further comprising:

a semi-insulating (SI) indium phosphide (InP) substrate;

an epitaxial layer stack formed on the SI:InP substrate comprising a plurality of semiconductor layers structured to form the EAM, the epitaxial layer stack comprising:

an n-layer structure and a p-layer structure;

an i-region comprising optical material located between the n-layer structure and the p-layer structure, the i-region defining an operational wavelength range;

the n-layer structure and the p-layer structure configured to optically confine one or more modes of an optical signal configured to propagate through the i-region; and one or more heterojunction bipolar transistors (HBTs) of the EAM driver circuit formed from another plurality of semiconductor layers of the epitaxial layer stack different from the plurality of semiconductor layers forming the EAM;

wherein at least one of the n-layer structure and the p-layer structure comprising a mode-extending layer.

29. A waveguide (WG)-device configured to modulate light and comprising a p type material, an i-type material and an n-type materials (a PIN waveguide), the waveguide-device comprising:

a semi-insulating (SI) indium phosphide (InP) substrate;

an epitaxial layer stack formed on the SI:InP substrate comprising a plurality of semiconductor layers structured to form the WG device, the epitaxial layer stack comprising an n-layer structure and a p-layer structure and an i-region between the n-layer structure and the p-layer structure;

the i-region comprising optical material defining an operational wavelength range located and having a selected thickness d;

the n-layer structure and the p-layer structure configured to optically confine one or more modes of an optical signal configured to propagate through the i-region; and wherein the selected thickness d of the i-region is related to a transit time $t_{tr}$ of carriers in the i-region to balance: one or more of:

i) a capacitance of the i-region;

ii) a required dynamic extinction ratio; and iii) optical confinement of the one or more modes of the optical signal through the i-region for absorption;

where $t_{tr}=d/v$, and v is a carrier velocity of the carrier.

30. The waveguide (WG)-device of claim 29, wherein the optical confinement of the one or more modes of the optical signal through the i-region is further provided by at least one mode-extending layer located in at least one of the n-layer structure and the p-layer structure.

* * * * *